US012717159B2

(12) United States Patent
Lin et al.

(10) Patent No.: US 12,717,159 B2
(45) Date of Patent: Aug. 25, 2026

(54) OPTICAL ENGINE MODULE AND NEAR-EYE DISPLAY APPARATUS

(71) Applicant: Coretronic Corporation, Hsin-Chu (TW)

(72) Inventors: Tzu-Hung Lin, Hsin-Chu (TW); Chung-Yang Fang, Hsin-Chu (TW); Wen-Chun Wang, Hsin-Chu (TW); Ching-Chuan Wei, Hsin-Chu (TW); Bo-Han Cheng, Hsin-Chu (TW); Wei-Ting Wu, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 274 days.

(21) Appl. No.: 18/665,550

(22) Filed: May 15, 2024

(65) Prior Publication Data

US 2024/0385463 A1 Nov. 21, 2024

(30) Foreign Application Priority Data

May 18, 2023 (CN) ......................... 202310559765.8

(51) Int. Cl.

| | |
|---|---|
| ***G02B 30/25*** | (2020.01) |
| ***G02F 1/1335*** | (2006.01) |
| ***G02F 1/1337*** | (2006.01) |

(52) U.S. Cl.

CPC ....... *G02B 30/25* (2020.01); *G02F 1/133526* (2013.01); *G02F 1/1337* (2013.01)

(58) Field of Classification Search

CPC .. G02B 30/25; G02F 1/133526; G02F 1/1337

See application file for complete search history.

(56) References Cited

U.S. PATENT DOCUMENTS

2024/0161420 A1* 5/2024 Chiu ..................... G06T 19/006

FOREIGN PATENT DOCUMENTS

| | | |
|---|---|---|
| CN | 114675417 | 6/2022 |
| CN | 114930225 | 8/2022 |
| TW | 202006442 | 2/2020 |

* cited by examiner

*Primary Examiner* — David Y Chung

(74) *Attorney, Agent, or Firm* — JCIPRNET

(57) ABSTRACT

An optical engine module including a display panel, a transflective layer, a polarizing reflective layer, a first bifocal lens, a first and second electrically controlled half waveplate is provided. The transflective layer is disposed between the display panel and the polarizing reflective layer. The polarizing reflective layer is configured to allow the light beam having a first polarization state to pass through, and reflect the light beam having a second polarization state. The first and second electrically controlled half waveplate are disposed between the transflective layer and the polarizing reflective layer. The first bifocal lens disposed between the first and second electrically controlled half waveplate has a first focal length for the light beam with the first polarization state, and has a second focal length for the light beam with the second polarization state.

22 Claims, 20 Drawing Sheets

OPTICAL ENGINE MODULE AND NEAR-EYE DISPLAY APPARATUS

CROSS-REFERENCE TO RELATED APPLICATION

This application claims the priority benefit of China application serial no. 202310559765.8 filed on May 18, 2023. The entirety of the above-mentioned patent application is hereby incorporated by reference herein and made a part of this specification.

BACKGROUND

Technical Field

The disclosure relates to a light adjustment module and a display apparatus, and in particular relates to an optical engine module and a near-eye display apparatus.

Description of Related Art

In recent years, virtual reality (VR) and augmented reality (AR) display technologies have developed vigorously. So far, various optical systems for head-mounted displays (HMDs) or near-eye displays (NEDs) have been developed. However, when the user is operating this type of display, if the accommodation distance of one eye and the vergence distance of two eyes of the image are different, that is, a vergence-accommodation conflict (VAC) issue, it will confuse the brain and cause physical discomfort. Therefore, it is still urgent to develop a lightweight head-mounted/near-eye display apparatus that may avoid the above-mentioned issue.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention was acknowledged by a person of ordinary skill in the art.

SUMMARY

An optical engine module with adjustable imaging distance and small main body size is provided in the invention.

A near-eye display apparatus capable of providing better three-dimensional visual experience is provided in the invention.

In order to achieve one of, or portions of, or all of the above objectives or other objectives, an optical engine module is provided in an embodiment of the invention. The optical engine module includes a display panel, a transflective layer, a polarizing reflective layer, a first bifocal lens, a first electrically controlled half waveplate, and a second electrically controlled half waveplate. The display panel is configured to emit a light beam. The transflective layer is disposed on one side of a display surface of the display panel, and is configured to allow a portion of the light beam to pass through and reflect another portion of the light beam. A polarizing reflective layer is disposed on a side of the transflective layer away from the display panel. The polarizing reflective layer is configured to allow the light beam having a first polarization state to pass through, and reflect the light beam having a second polarization state. The first polarization state is orthogonal to the second polarization state. The first bifocal lens is disposed between the transflective layer and the polarizing reflective layer. The first bifocal lens has a first focal length for the light beam having the first polarization state and a second focal length for the light beam having the second polarization state. The first focal length is different from the second focal length. The first electrically controlled half waveplate is disposed between the first bifocal lens and the transflective layer, and is configured to switch a polarization state of the light beam between the first polarization state and the second polarization state or maintain the polarization state of the light beam. The second electrically controlled half waveplate is disposed between the first bifocal lens and the polarizing reflective layer, and is configured to switch the polarization state of the light beam between the first polarization state and the second polarization state or maintain the polarization state of the light beam.

In order to achieve one of, or portions of, or all of the above objectives or other objectives, an embodiment of the invention provides a near-eye display apparatus configured to be worn on a head of a user. The near-eye display apparatus includes a main body, a first optical engine module, and a second optical engine module. The first optical engine module and the second optical engine module are arranged on the main body. Each of the first optical engine module and the second optical engine module includes a display panel, a transflective layer, a polarizing reflective layer, a first bifocal lens, a first electrically controlled half waveplate, and a second electrically controlled half waveplate. The display panel is configured to emit a light beam. The transflective layer is disposed on one side of a display surface of the display panel, and is configured to allow a portion of the light beam to pass through and reflect another portion of the light beam. A polarizing reflective layer is disposed on a side of the transflective layer away from the display panel. The polarizing reflective layer is configured to allow the light beam having a first polarization state to pass through, and reflect the light beam having a second polarization state. The first polarization state is orthogonal to the second polarization state. The first bifocal lens is disposed between the transflective layer and the polarizing reflective layer. The first bifocal lens has a first focal length for the light beam having the first polarization state and a second focal length for the light beam having the second polarization state. The first focal length is different from the second focal length. The first electrically controlled half waveplate is disposed between the first bifocal lens and the transflective layer, and is configured to switch the polarization state of the light beam between the first polarization state and the second polarization state or maintain the polarization state of the light beam. The second electrically controlled half waveplate is disposed between the first bifocal lens and the polarizing reflective layer, and is configured to switch a polarization state of the light beam between the first polarization state and the second polarization state or maintain the polarization state of the light beam.

Based on the above, in the optical engine module and the near-eye display apparatus according to an embodiment of the present invention, a transflective layer is provided between the display surface of the display panel and the polarizing reflective layer. By disposing two electrically controlled half waveplates and a bifocal lens located between the two electrically controlled half waveplates between the transflective layer and the polarizing reflective layer, the light beam from the display panel may switch the image position between at least two image positions. Accordingly, the vergence-accommodation conflict issue in the user operation of the near-eye display apparatus may be effectively prevented, thereby enhancing the visual experience of the three-dimensional image. On the other hand, by using the reflection properties of the polarizing reflective layer and the transflective layer for the light beam of a specific polarization state and the difference in the focusing properties of the bifocal lens for the light beam of different polarization states, the imaging distance of images in a limited space may be greatly increased. Therefore, the size and weight of the optical engine module may be effectively reduced.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF DISCLOSED EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention may be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
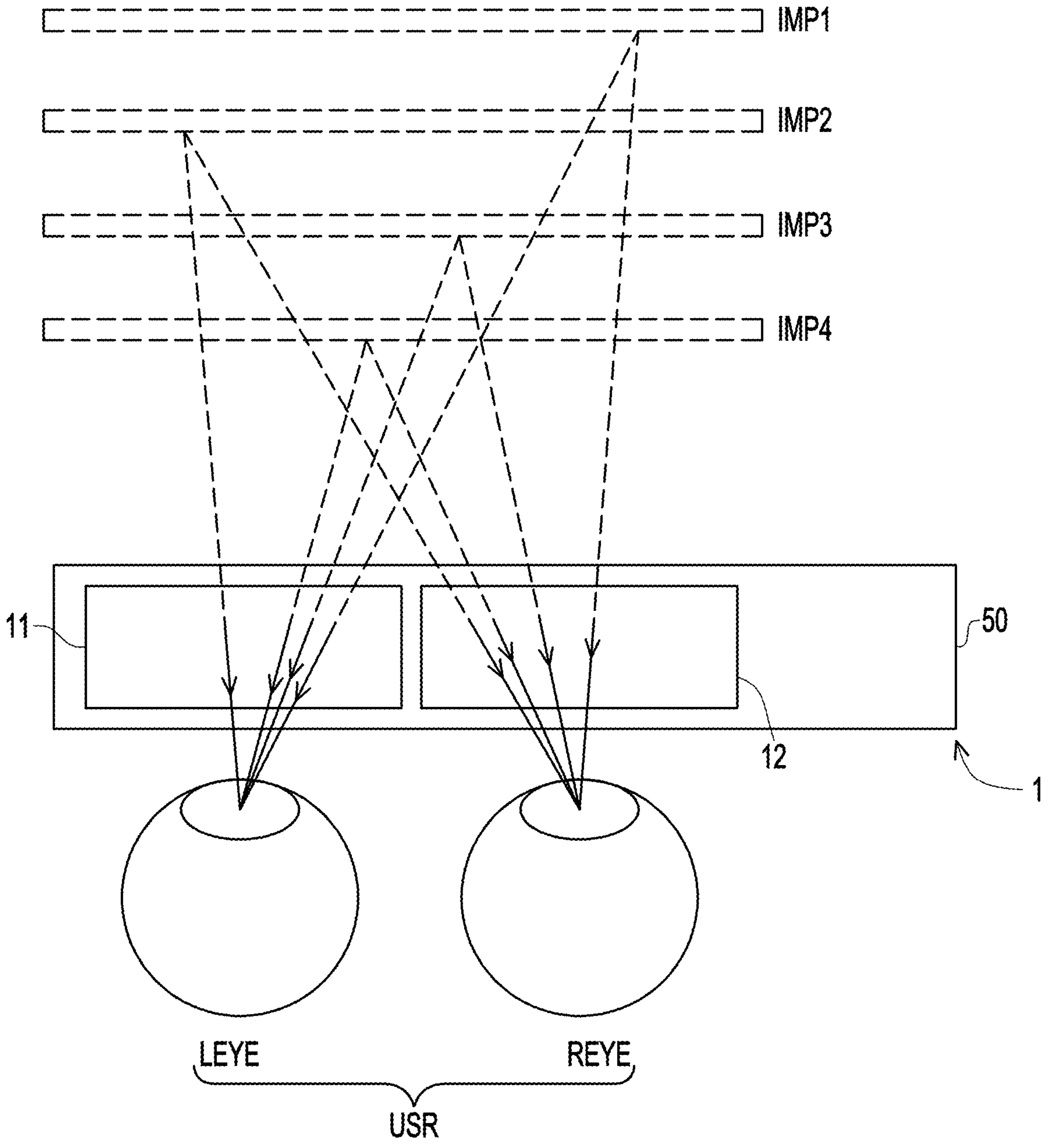
FIG. 1 is a schematic diagram of a near-eye display apparatus imaging at different image positions according to an embodiment of the present invention.
Figure 2:
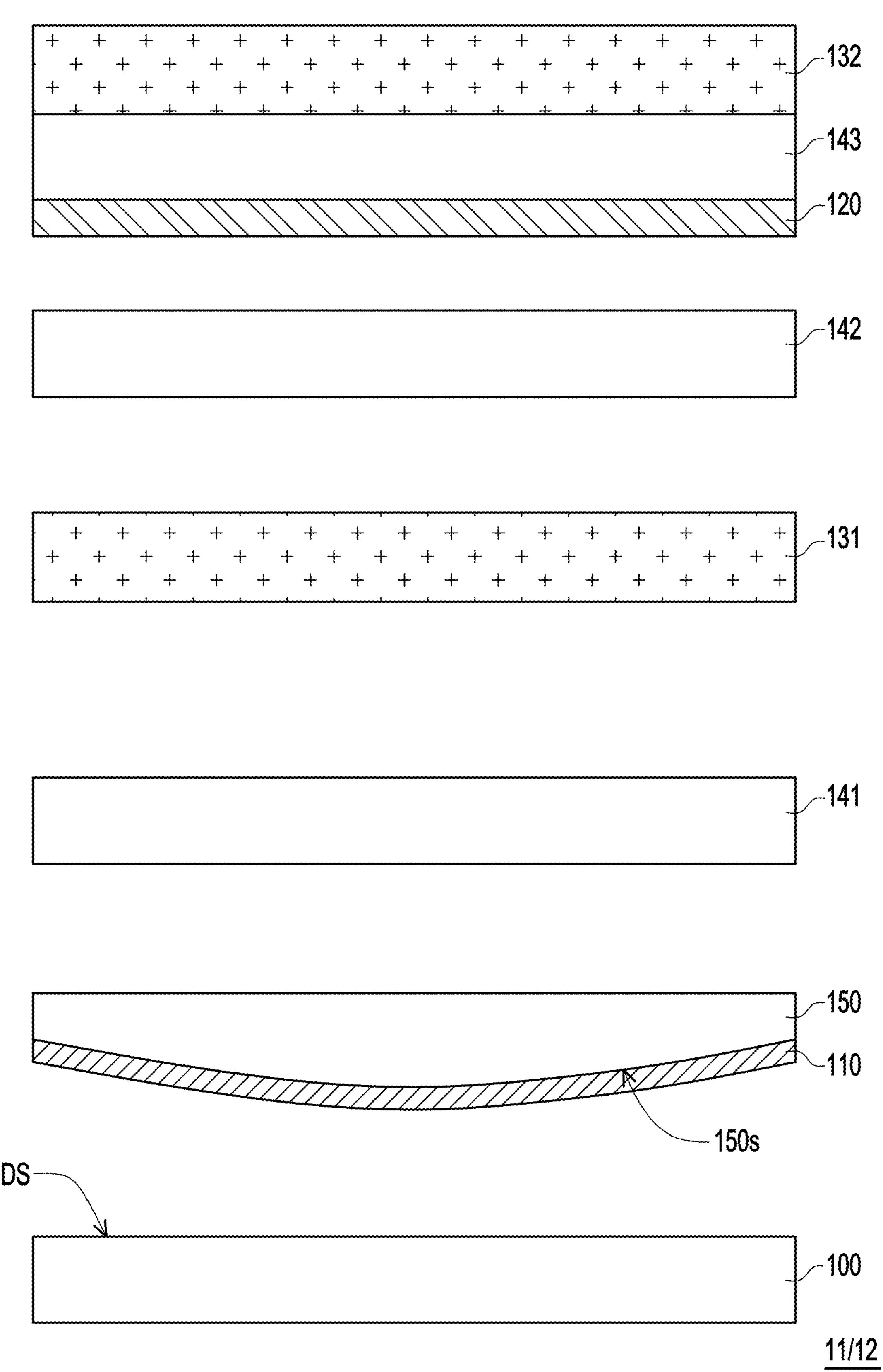
FIG. 2 is a cross-sectional schematic diagram of an optical engine module according to an embodiment of the present invention.
Figure 3:
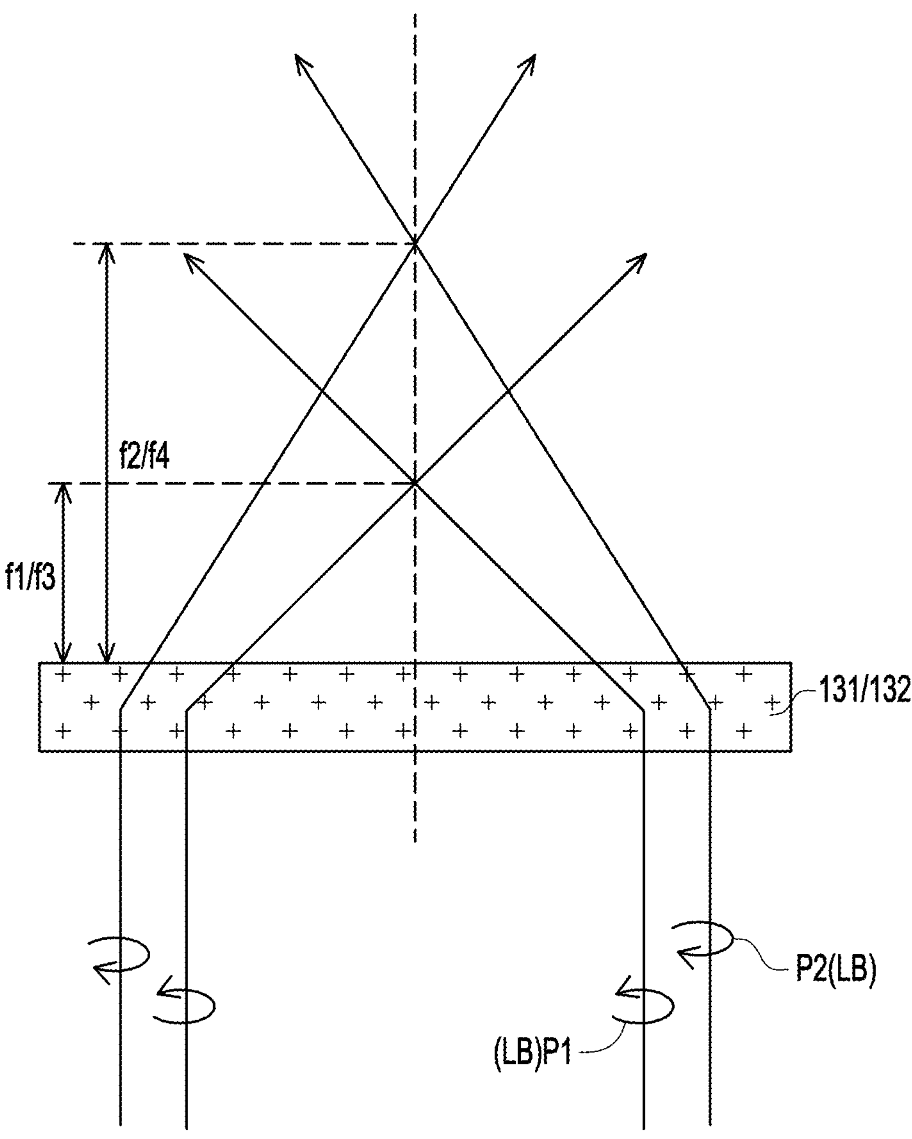
FIG. 3 is a schematic diagram of the focusing of light beam of different polarization states by the bifocal lens of FIG. 2.
Figure 4A:
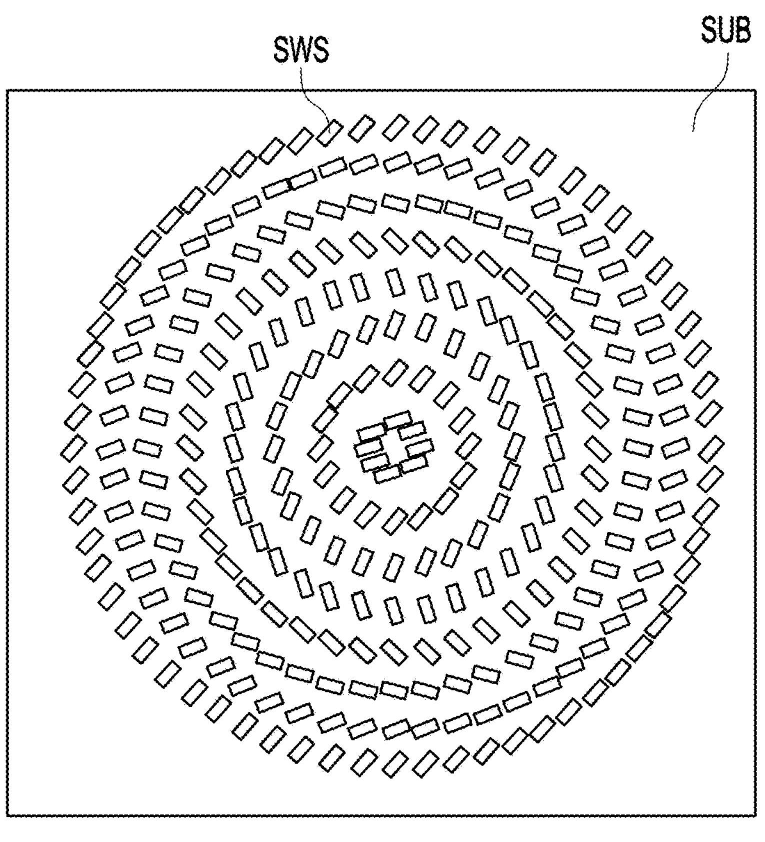
FIG. 4A is a schematic front view of the bifocal lens in FIG. 2.
Figure 4B:
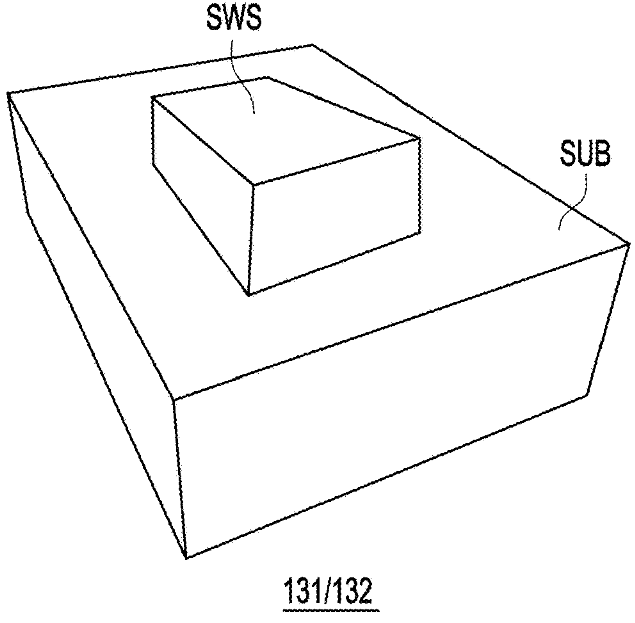
FIG. 4B is a three-dimensional schematic diagram of the sub-wavelength structure of the bifocal lens in FIG. 4A.
Figure 5:
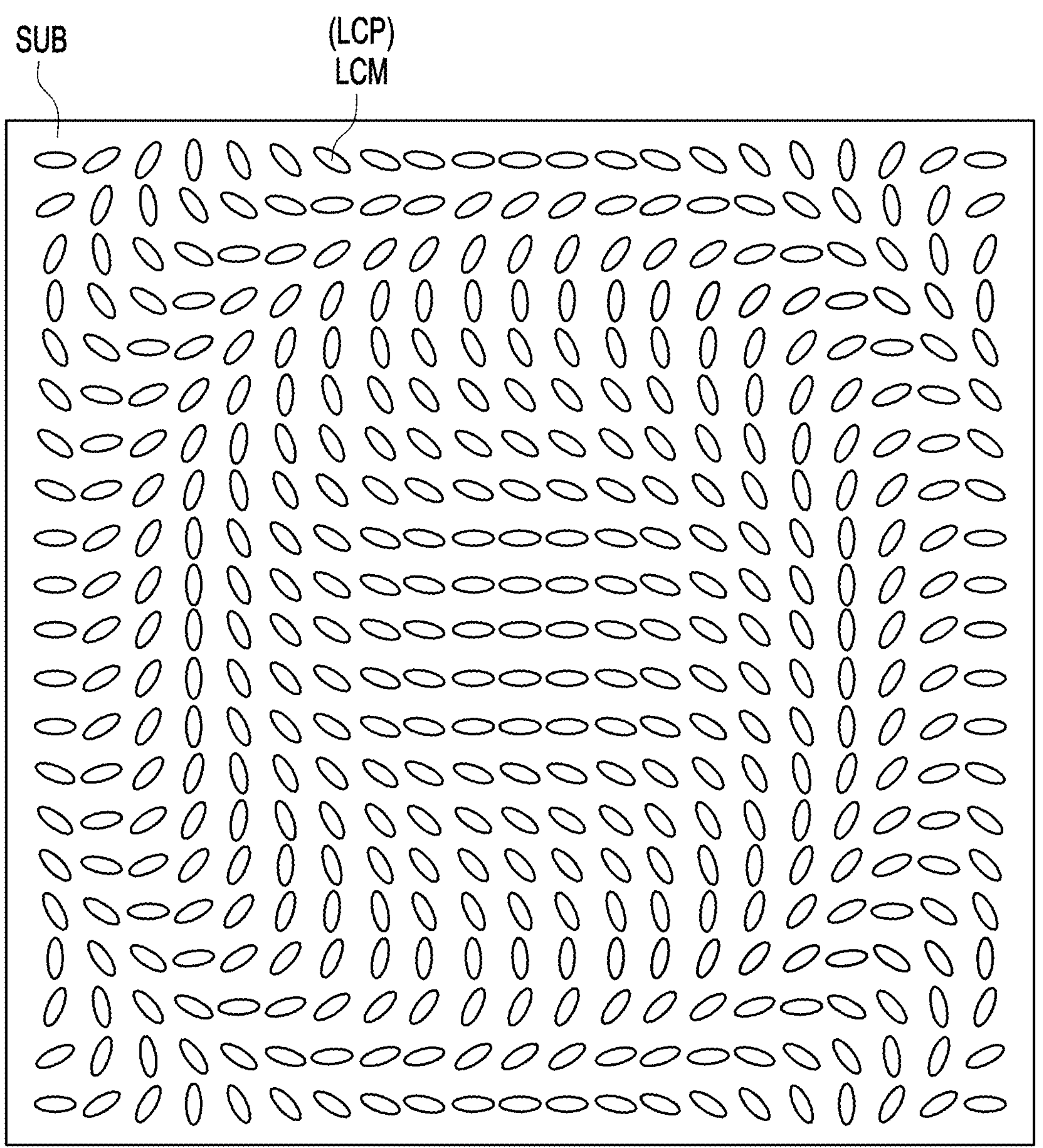
FIG. 5 is a schematic front view of a bifocal lens of another modified embodiment of FIG. 2.

FIG. 1 is a schematic diagram of a near-eye display apparatus imaging at different image positions according to an embodiment of the present invention. FIG. 2 is a cross-sectional schematic diagram of an optical engine module according to an embodiment of the present invention. FIG. 3 is a schematic diagram of the focusing of light beam of different polarization states by the bifocal lens of FIG. 2. FIG. 4A is a schematic front view of the bifocal lens in FIG. 2. FIG. 4B is a three-dimensional schematic diagram of the sub-wavelength structure of the bifocal lens in FIG. 4A. FIG. 5 is a schematic front view of a bifocal lens of another modified embodiment of FIG. 2. FIG. 6A to FIG. 6D are schematic diagrams of the operation of the optical engine module in FIG. 2 performing imaging at different image positions.

Referring to FIG. 1, the near-eye display apparatus 1 includes a main body 50, a first optical engine module 11, and a second optical engine module 12. In this embodiment, the near-eye display apparatus 1 is configured to be worn on the head of the user USR, and a first optical engine module 11 and a second optical engine module 12 are provided on the main body 50 respectively corresponding to the left eye LEYE and the right eye REYE of the user USR. For example, the two optical engine modules are configured to project two images with parallax onto the retinas of both eyes of the user USR, and the two images may be integrated into a three-dimensional image with depth expression through the operation of the brain.

In this embodiment, the main body 50 may be any structural design configured to be worn or mounted on the head of the user USR, such as a spectacle frame/glasses frame or a helmet, but not limited thereto. The near-eye display apparatus 1 may provide the user USR with imaging effects in at least two different image positions through the optical engine module of this embodiment. For example, the first optical engine module 11 and the second optical engine module 12 may select a suitable position among the image position IMP1, the image position IMP2, the image position IMP3, and the image position IMP4 arranged in order from far to near according to the depth information of the image to form the image.

Figure 6A:
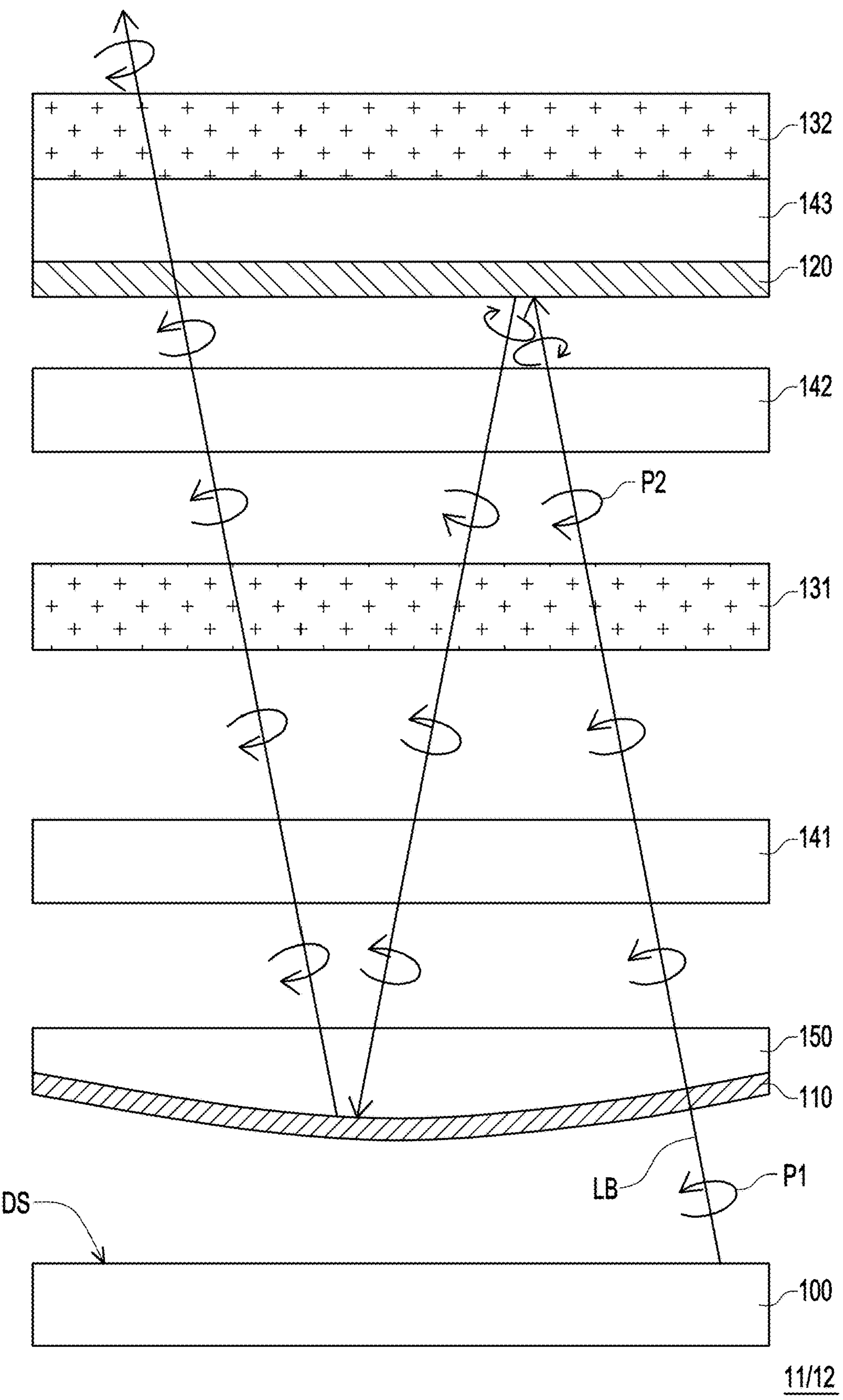
FIG. 6A to FIG. 6D are schematic diagrams of the operation of the optical engine module in FIG. 2 performing imaging at different image positions.

Referring to FIG. 2 and FIG. 6A, each of the first optical engine module 11 and the second optical engine module 12 includes a display panel 100, a transflective layer 110, and a polarizing reflective layer 120. The display panel 100 is configured to emit a light beam LB from one side of the display surface DS. In this embodiment, the light beam LB emitted by the display panel 100 may have a polarization state (e.g., the first polarization state P1). In another embodiment, a polarizer may be disposed between the display panel 100 and the transflective layer 110, so the light beam may not have a polarization state.

The transflective layer 110 is disposed on one side of the display surface DS of the display panel 100 and is configured to allow a portion of the light beam LB to pass through and reflect another portion of the light beam LB. For example, in this embodiment, the transflective layer 110 allows half of the light beam LB to pass through and reflects the other half of the light beam LB, that is, the transflective layer 110 may be a semi-transmissive and semi-reflective layer. When a portion of the light beam with a circular polarization state is reflected by the transflective layer 110, the polarization state of the light beam LB changes to another circular polarization state that is orthogonal to the circular polarization state before reflection, and the polarization state of the other portion of the light beam with the circular polarization state is unchanged after passing through the transflective layer 110. For example, in this embodiment, the polarization state of the light beam LB reflected by the transflective layer 110 may be changed from the first circular polarization state to the second circular polarization state, or from the second circular polarization state to the first circular polarization state. The first circular polarization state and the second circular polarization state are orthogonal to each other.

The polarizing reflective layer 120 is disposed on the side of the transflective layer 110 away from the display panel 100, and is configured to allow the light beam LB having the first polarization state P1 to pass through and reflect the light beam LB having the second polarization state P2. The first polarization state P1 is orthogonal to the second polarization state P2. The orthogonal relationship between the two polarization states means that the inner product of the electric field vectors of the two polarization states is substantially zero. For example, two linear polarization states with electric field polarization directions perpendicular to each other or the left-handed circular polarization state and the right-handed circular polarization state with opposite polarization handedness. In this embodiment, the first polarization state P1 and the second polarization state P2 may be respectively a first circular polarization state (e.g., a left-handed circular polarization state) and a second circular polarization state (e.g., a right-handed circular polarization state) that are orthogonal to each other.

In this embodiment, the polarizing reflective layer 120 is, for example, a circular polarizing reflective layer, which may be formed of a left-handed or right-handed cholesteric liquid crystal layer, or a multi-layer reflective polarizing film (e.g., advanced polarizing film (APF)) and a quarter waveplate. In other embodiments, the polarizing reflective layer may be a linear polarizing reflective layer, such as a multilayer reflective polarizing film (e.g., APF).

Each of the first optical engine module 11 and the second optical engine module 12 further includes a first bifocal lens 131, a first electrically controlled half waveplate 141 and a second electrically controlled half waveplate 142. The first bifocal lens 131 is disposed between the transflective layer 110 and the polarizing reflective layer 120. The first electrically controlled half waveplate 141 is disposed between the first bifocal lens 131 and the transflective layer 110. The second electrically controlled half waveplate 142 is disposed between the first bifocal lens 131 and the polarizing reflective layer 120. In this embodiment, each of the first optical engine module 11 and the second optical engine module 12 may further selectively include a second bifocal lens 132 and a third electrically controlled half waveplate 143. The second bifocal lens 132 is disposed on a side of the polarizing reflective layer 120 away from the first bifocal lens 131, and the third electrically controlled half waveplate 143 is disposed between the polarizing reflective layer 120 and the second bifocal lens 132.

The first electrically controlled half waveplate 141, the second electrically controlled half waveplate 142, and the third electrically controlled half waveplate 143 are, for example, liquid crystal panels of twisted nematic (TN), vertical alignment (VA), electrically controlled birefringence (ECB), or in-plane switching (IPS).

These electrically controlled half waveplates may selectively make the light beam LB have half-wavelength phase delay or no phase delay. These electrically controlled half waveplates are configured to switch the polarization state of the light beam LB between the first polarization state P1 and the second polarization state P2 orthogonal to each other or maintain the polarization state of the light beam LB.

Referring to FIG. 3, the first bifocal lens 131 has a first focal length f1 for the light beam LB having the first polarization state P1, and has a second focal length f2 for the light beam LB having the second polarization state P2. The first focal length f1 is different from the second focal length f2. Similarly, the second bifocal lens 132 has a third focal length f3 for the light beam LB having the first polarization state P1 and has a fourth focal length f4 for the light beam LB having the second polarization state P2. The third focal length f3 is different from the fourth focal length f4.

For example, in this embodiment, the structural designs of the first bifocal lens 131 and the second bifocal lens 132 may be selectively the same. The first focal length f1 of the first bifocal lens 131 and the third focal length f3 of the second bifocal lens 132 may be the same, and the second focal length f2 of the first bifocal lens 131 and the fourth focal length f4 of the second bifocal lens 132 may be the same. In other embodiments, each of the first focal length f1 and the second focal length f2 of the first bifocal lens 131 may be different from the third focal length f3 and the fourth focal length f4 of the second bifocal lens 132.

Referring to FIG. 4A and FIG. 4B, in this embodiment, the first bifocal lens 131 and the second bifocal lens 132 are, for example, a Pancharatnam-Berry phase metalens, and may include a transmissive substrate SUB and multiple sub-wavelength structures SWS. These sub-wavelength structures SWS formed of low-absorption materials are, for example, strip-shaped or fin-shaped structures, and are disposed on the transmissive substrate SUB in a specific arrangement. For example, in this embodiment, these sub-wavelength structures SWS may be arranged at intervals in multiple concentric circles, and the extension direction or pointing direction of the sub-wavelength structures SWS on these concentric circles may be set in a rotating and gradual manner (as shown in FIG. 4A). Through such an arrangement, the bifocal lens may form different phase modulations for light beams of different polarization states.

Referring to FIG. 5, in another modified embodiment, the first bifocal lens 131A and the second bifocal lens 132A may also be a Pancharatnam-Berry phase liquid crystal lens, which may include a transmissive substrate SUB and a liquid crystal polymer LCP. The liquid crystal polymer LCP is disposed on the transmissive substrate SUB, and the liquid crystal polymer LCP is formed of, for example, a polymer (not shown) and multiple liquid crystal molecules LCM dispersed therein. These liquid crystal molecules LCM may be arranged into multiple quasi-concentric circles, and the axial direction of the long axis (or optical axis) of the liquid crystal molecules may be set in a rotating and gradual manner.

In this embodiment, the polarization state of the light beam after passing through the first bifocal lens 131 and/or the second bifocal lens 132 may be changed from the first circular polarization state to the second circular polarization state, or changed from the second circular polarization state to the first circular polarization state.

Referring to FIG. 2, each of the first optical engine module 11 and the second optical engine module 12 may selectively include a lens 150 disposed between the display panel 100 and the first electrically controlled half waveplate 141. For example, the lens 150 may be a plano-convex lens with a convex surface facing the display panel 100. In other embodiments, the lens 150 may also be a biconvex lens.

In this embodiment, the transflective layer 110 may be selectively disposed on the side surface 150*s* (i.e., the convex surface) of the lens 150 facing the display panel 100. According to other embodiments, the transflective layer 110 may also be disposed on a side surface (i.e., a plane) of the lens 150 facing the first electrically controlled half waveplate 141, which may simplify the manufacturing process.

The various operation modes of the optical engine module of this embodiment are exemplarily described below.

Referring to FIG. 6A, when the first electrically controlled half waveplate 141, the second electrically controlled half waveplate 142, and the third electrically controlled half waveplate 143 are disabled, the light beam LB from the display panel 100 forms an image at the first image position (one of the four image positions IMP1 to IMP4 shown in FIG. 1) according to the first light path. After a portion of the light beam LB from the display panel 100 and having the first polarization state P1 passes through the transflective layer 110, the lens 150 and the disabled first electrically controlled half waveplate 141, the polarization state of the light beam LB is unchanged. The light beam LB having the first polarization state P1 from the first electrically controlled half waveplate 141 forms the light beam LB having the second polarization state P2 after passing through the first bifocal lens 131.

After the light beam LB from the first bifocal lens 131 and having the second polarization state P2 passes through the disabled second electrically controlled half waveplate 142 for the first time, is reflected by the polarizing reflective layer 120, and passes through the disabled second electrically controlled half waveplate 142 for the second time in sequence, the polarization state of the light beam LB is unchanged. After the light beam LB from the second electrically controlled half waveplate 142 and having the second polarization state P2 passes through the first bifocal lens 131 for the second time, the light beam LB having the first polarization state P1 is formed. After the light beam LB passing through the first bifocal lens 131 for the second time and having the first polarization state P1 passes through the first electrically controlled half waveplate 141 and the lens 150 for the second time, the polarization state of the light beam LB is unchanged.

After the light beam LB passing through the lens 150 for the second time and having the first polarization state P1 is reflected by the transflective layer 110, the polarization state of the light beam LB changes to the second polarization state P2. After the light beam LB reflected by the transflective layer 110 and having the second polarization state P2 passes through the lens 150 and the disabled first electrically controlled half waveplate 141 for the third time, the polarization state of the light beam LB is unchanged. After the light beam LB passing through the first electrically controlled half waveplate 141 for the third time and having the second polarization state P2 passes through the first bifocal lens 131 for the third time, the polarization state of the light beam LB changes to the first polarization state P1.

After the light beam LB passing through the first bifocal lens 131 for the third time and having the first polarization state P1 passes through the second electrically controlled half waveplate 142, the polarizing reflective layer 120, and the third electrically controlled half waveplate 143, the polarization state of the light beam LB is unchanged. The light beam LB passing through the third electrically controlled half waveplate 143 and having the first polarization state P1 passes through the second bifocal lens 132 to form the light beam LB having the second polarization state P2, which is then transmitted to the left eye LEYE and/or the right eye REYE of the user USR.

Figure 6B:
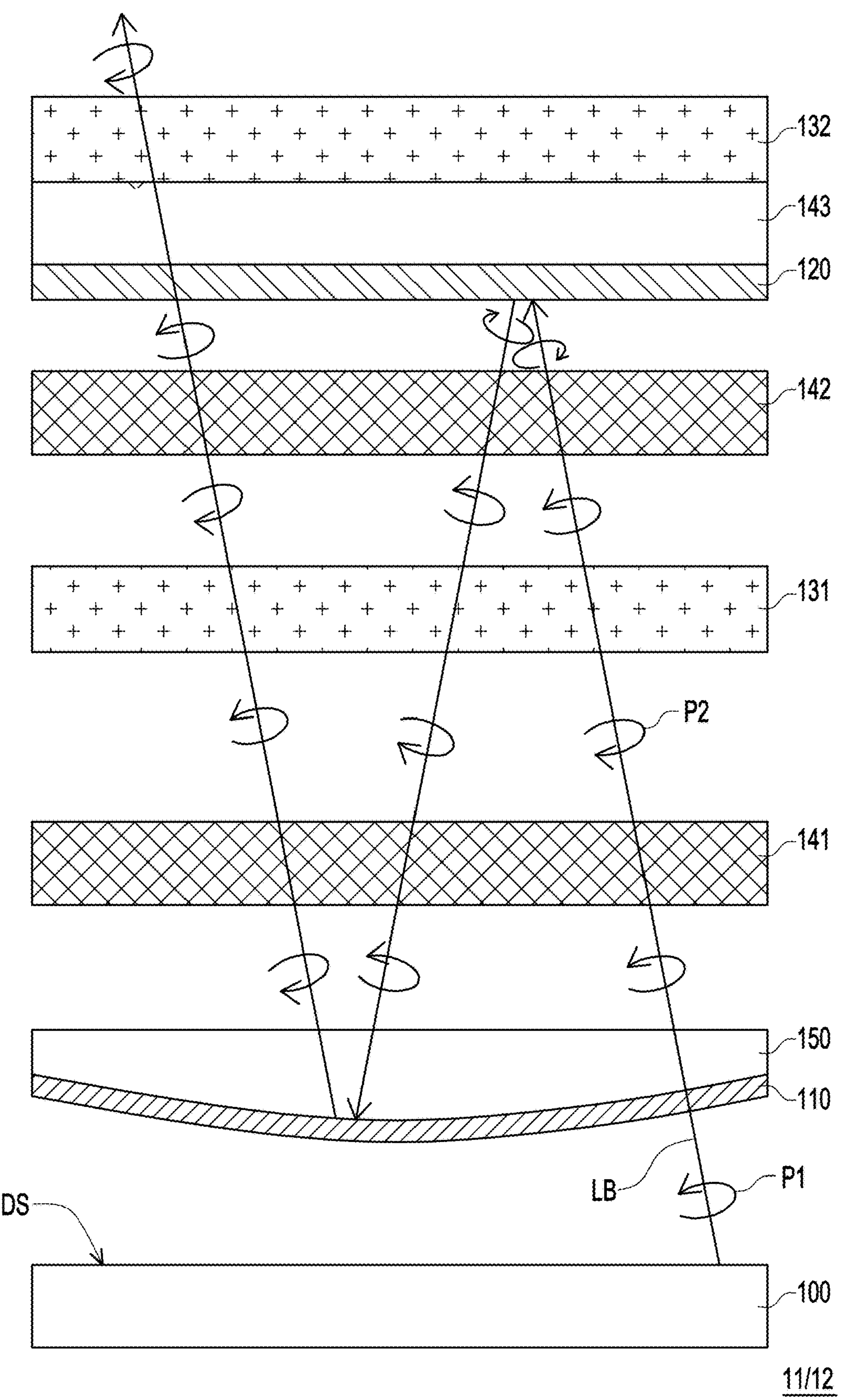

Referring to FIG. 6B, when the first electrically controlled half waveplate 141 and the second electrically controlled half waveplate 142 are enabled and the third electrically controlled half waveplate 143 is disabled, the light beam LB from the display panel 100 forms an image at the second image position (one of the four image positions IMP1 to IMP4 shown in FIG. 1) according to the second light path. After a portion of the light beam LB from the display panel 100 and having the first polarization state P1 passes through the transflective layer 110 and the lens 150, the polarization state of the light beam LB is unchanged. After the light beam LB from the lens 150 and having the first polarization state P1 passes through the enabled first electrically controlled half waveplate 141, the polarization state of the light beam LB changes to the second polarization state P2. The light beam LB from the first electrically controlled half waveplate 141 and having the second polarization state P2 forms the light beam LB having the first polarization state P1 after passing through the first bifocal lens 131.

After the light beam LB from the first bifocal lens 131 and having the first polarization state P1 passes through the enabled second electrically controlled half waveplate 142, the polarization state of the light beam LB changes to the second polarization state P2. The polarization state of the light beam LB passing through the second electrically controlled half waveplate 142 still maintains the second polarization state P2 after the light beam LB being reflected by the polarizing reflective layer 120, and the light beam LB is transmitted to the enabled second electrically controlled half waveplate 142 again. The polarization state of the light beam LB passing through the second electrically controlled half waveplate 142 for the second time changes from the second polarization state P2 to the first polarization state P1. After the light beam LB passing through the second electrically controlled half waveplate 142 for the second time and having the first polarization state P1 passes through the first bifocal lens 131 for the second time, the polarization state of the light beam LB changes to the second polarization state P2.

After the light beam LB passing through the first bifocal lens 131 for the second time and having the second polarization state P2 passes through the first electrically controlled half waveplate 141 for the second time, the polarization state of the light beam LB changes to the first polarization state P1. After the light beam LB passing through the first electrically controlled half waveplate 141 for the second time and having the first polarization state P1 passes through the lens 150 and is reflected by the transflective layer 110, the polarization state of the light beam LB changes to the second polarization state P2. After the light beam LB reflected by the transflective layer 110 and having the second polarization state P2 passes through the lens 150 and the first electrically controlled half waveplate 141 for the third time, the polarization state of the light beam LB changes to the first polarization state P1. After the light beam LB passing through the first electrically controlled half waveplate 141 for the third time and having the first polarization state P1 passes through the first bifocal lens 131 for the third time, the polarization state of the light beam LB changes to the second polarization state P2.

After the light beam LB passing through the first bifocal lens 131 for the third time and having the second polarization state P2 passes through the enabled second electrically controlled half waveplate 142 for the third time, the polarization state of the light beam LB changes to the first polarization state P1. After the light beam LB passing through the second electronically controlled half-wave plate 142 for the third time and having the first polarization state P1 passes through the polarizing reflective layer 120 and the disabled third electrically controlled half waveplate 143, the polarization state of the light beam LB is unchanged. The light beam LB passing through the third electrically controlled half waveplate 143 and having the first polarization state P1 passes through the second bifocal lens 132 to form the light beam LB having the second polarization state P2, which is then transmitted to the left eye LEYE and/or the right eye REYE of the user USR.

Figure 6C:
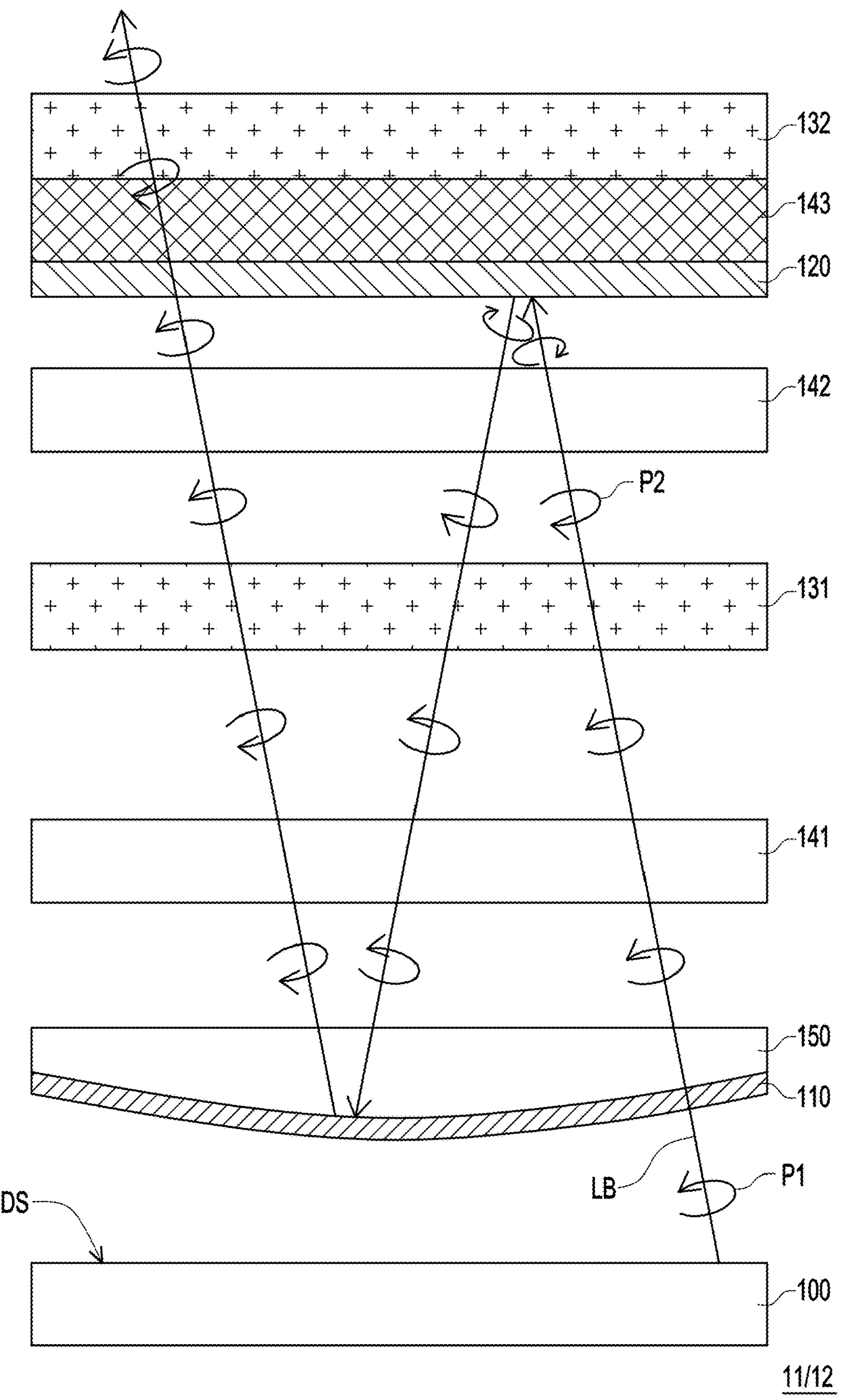

Referring to FIG. 6C, when the first electrically controlled half waveplate 141 and the second electrically controlled half waveplate 142 are disabled and the third electrically controlled half waveplate 143 is enabled, the light beam LB from the display panel 100 forms an image at the third image position (one of the four image positions IMP1 to IMP4 shown in FIG. 1) according to the third light path. The difference between the third light path and the aforementioned first light path (as shown in FIG. 6A) is only the light path after the light beam LB passes through the polarizing reflective layer 120. On the third light path, after the light beam LB passing through the polarizing reflective layer 120 and having the first polarization state P1 passes through the enabled third electrically controlled half waveplate 143, the polarization state of the light beam LB changes to the second polarization state P2.

The light beam LB passing through the third electrically controlled half waveplate 143 and having the second polarization state P2 passes through the second bifocal lens 132 to form the light beam LB having the first polarization state P1, which is then transmitted to the left eye LEYE and/or the right eye REYE of the user USR. Since the other parts of the third optical path are similar to the first optical path in FIG. 6A, please refer to the relevant paragraphs above for details, and details are not repeated herein.

Figure 6D:
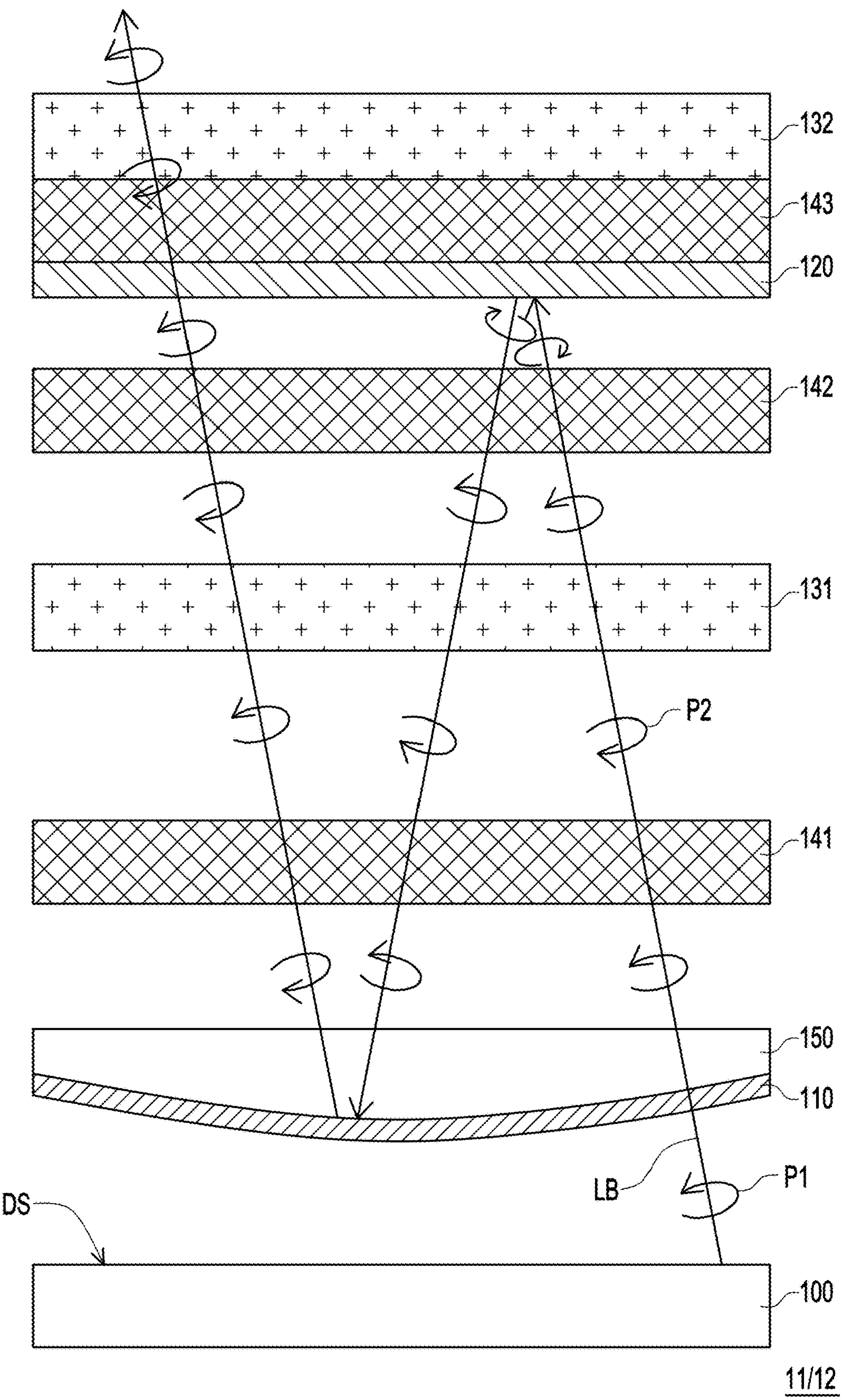

Referring to FIG. 6D, when the first electrically controlled half waveplate 141, the second electrically controlled half waveplate 142, and the third electrically controlled half waveplate 143 are enabled, the light beam LB from the display panel 100 forms an image at the fourth image position (one of the four image positions IMP1 to IMP4 shown in FIG. 1) according to the fourth light path. The difference between the fourth light path and the aforementioned second light path (as shown in FIG. 6B) is only the light path after the light beam LB passes through the polarizing reflective layer 120. On the fourth light path, after the light beam LB passing through the polarizing reflective layer 120 and having the first polarization state P1 passes through the enabled third electrically controlled half waveplate 143, the polarization state of the light beam LB changes to the second polarization state P2.

The light beam LB passing through the third electrically controlled half waveplate 143 and having the second polarization state P2 passes through the second bifocal lens 132 to form the light beam LB having the first polarization state P1, which is then transmitted to the left eye LEYE and/or the right eye REYE of the user USR. Since the other parts of the fourth optical path are similar to the second optical path in FIG. 6B, please refer to the relevant paragraphs above for details, and details are not repeated herein.

Referring to FIG. 1 and FIG. 6A to FIG. 6D, through the above four operation modes, the light beam LB emitted by the display panel 100 may be switched between four image positions IMP1 to IMP4 for imaging. Accordingly, the vergence-accommodation conflict issue in the user operation of the near-eye display apparatus may be greatly prevented, thereby enhancing the visual experience of the three-dimensional image. On the other hand, by using the reflection properties of the polarizing reflective layer 120 and the transflective layer 110 for the light beam LB of a specific polarization state and the difference in the focusing properties of the bifocal lens for the light beam LB of different polarization states, the imaging distance of images in a limited space may be greatly increased. Therefore, the size and weight of the optical engine module may be effectively reduced. For example, the optical engine module of this embodiment may have four different image positions within a thickness of 3 centimeters by setting two bifocal lenses and turning on or off three electrically controlled half waveplates, which may maintain good image quality.

In an optical engine module without the second bifocal lens 132 and the third electrically controlled half waveplate 143, the number of image positions for imaging may be two. For example, when the first electrically controlled half waveplate 141 and the second electrically controlled half waveplate 142 are disabled, the light beam LB from the display panel 100 forms an image at the first image position. When the first electrically controlled half waveplate 141 and the second electrically controlled half waveplate 142 are enabled, the light beam LB from the display panel 100 forms an image at the second image position, and the first image position is different from the second image position. The optical engine module may increase or decrease the number of image positions for imaging by adjusting the number of bifocal lenses and/or electrically controlled half waveplates.

Other embodiments are described below to explain the disclosure in detail, and the same components will be denoted by the same reference numerals, and the description of the same technical content will be omitted. For the description of the omitted part, reference may be made to the above embodiment, and details are not described in the following embodiments.

Figure 7:
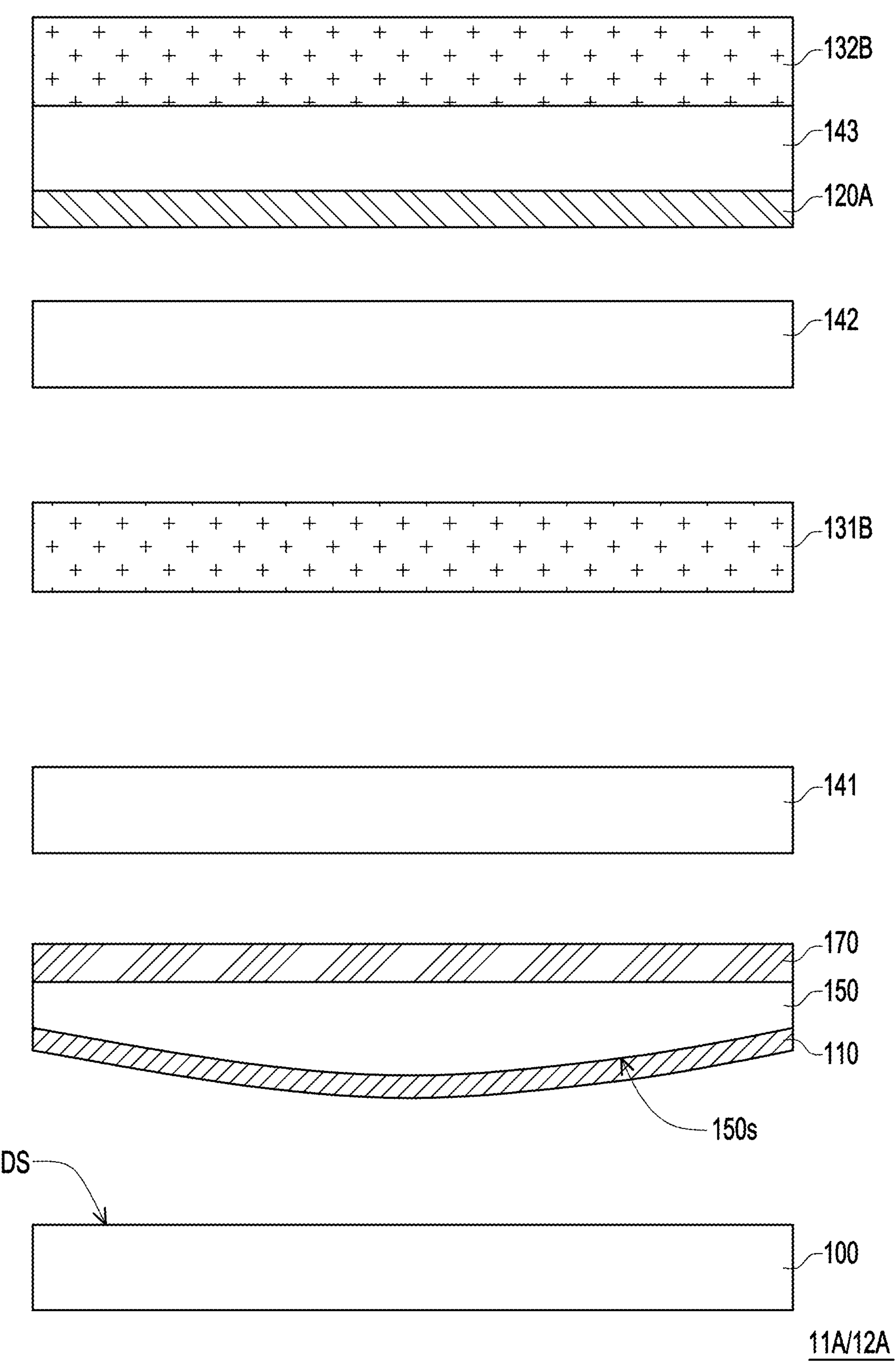
FIG. 7 is a cross-sectional schematic diagram of an optical engine module according to another embodiment of the present invention.
Figure 8A:
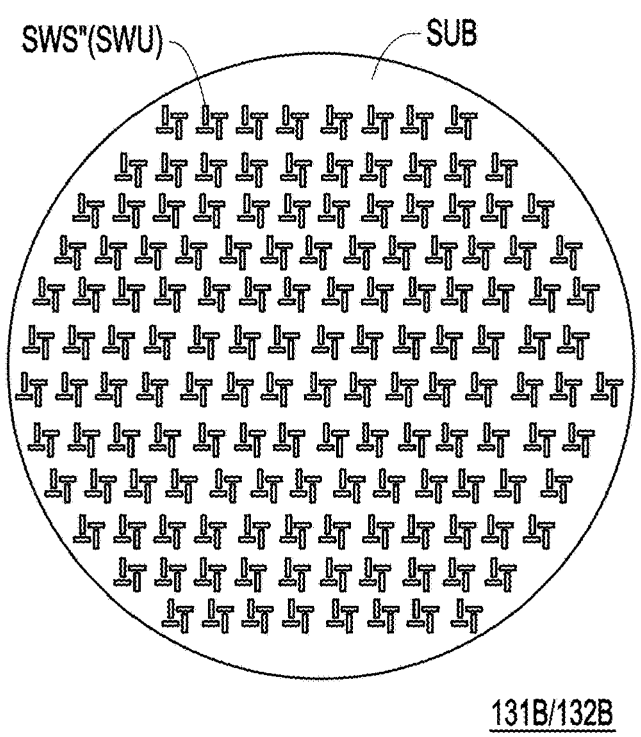
FIG. 8A is a schematic front view of the bifocal lens in FIG. 7.
Figure 8B:
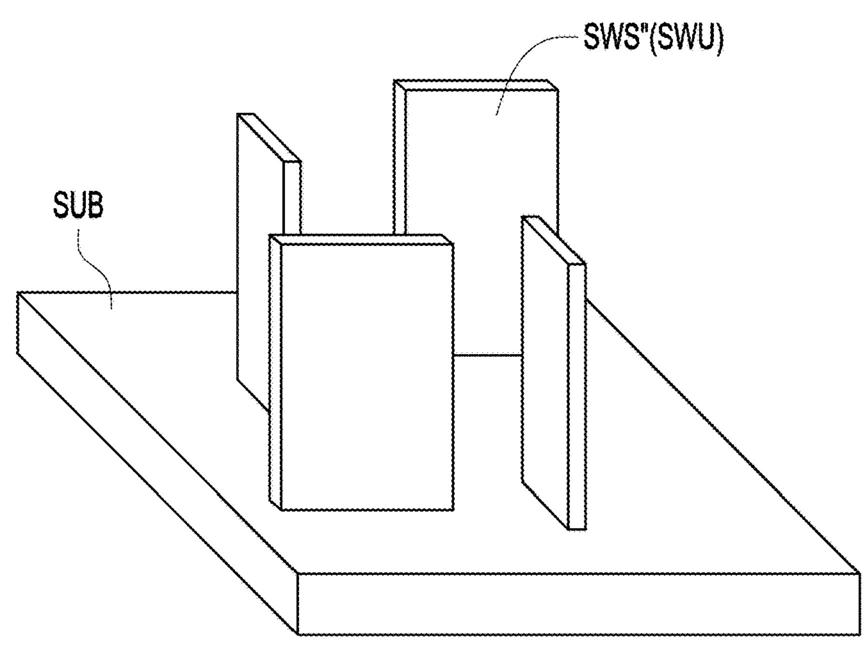
FIG. 8B is a three-dimensional schematic diagram of the sub-wavelength unit of the bifocal lens in FIG. 8A.
Figure 9A:
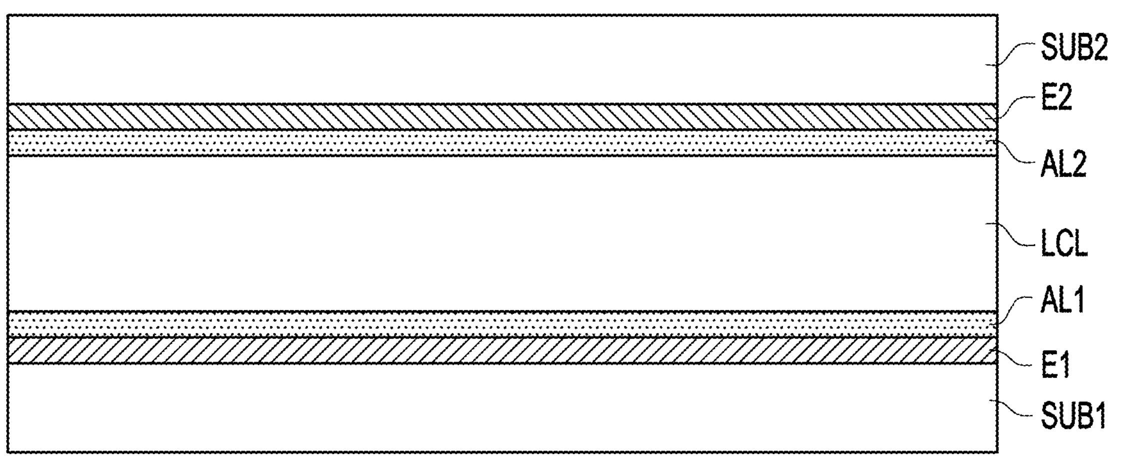
FIG. 9A is a cross-sectional schematic diagram of the electrically controlled half waveplate of FIG. 7.
Figure 9B:
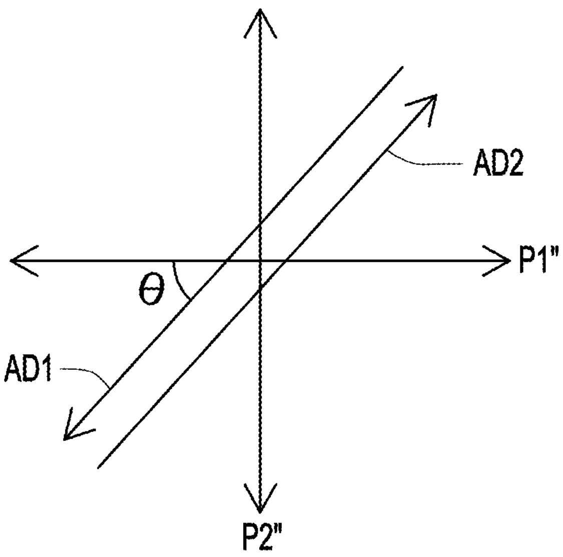
FIG. 9B is a schematic diagram showing the configuration relationship between the alignment direction of the alignment layer and the polarization direction of the polarization state of the incident light beam in FIG. 9A.

FIG. 7 is a cross-sectional schematic diagram of an optical engine module according to another embodiment of the present invention. FIG. 8A is a schematic front view of the bifocal lens in FIG. 7. FIG. 8B is a three-dimensional schematic diagram of the sub-wavelength unit of the bifocal lens in FIG. 8A. FIG. 9A is a cross-sectional schematic diagram of the electrically controlled half waveplate of FIG. 7. FIG. 9B is a schematic diagram showing the configuration relationship between the alignment direction of the alignment layer and the polarization direction of the polarization state of the incident light beam in FIG. 9A. FIG. 10A to FIG. 10D are schematic diagrams of the operation of the optical engine module in FIG. 7 performing imaging at different image positions.

Figure 10A:
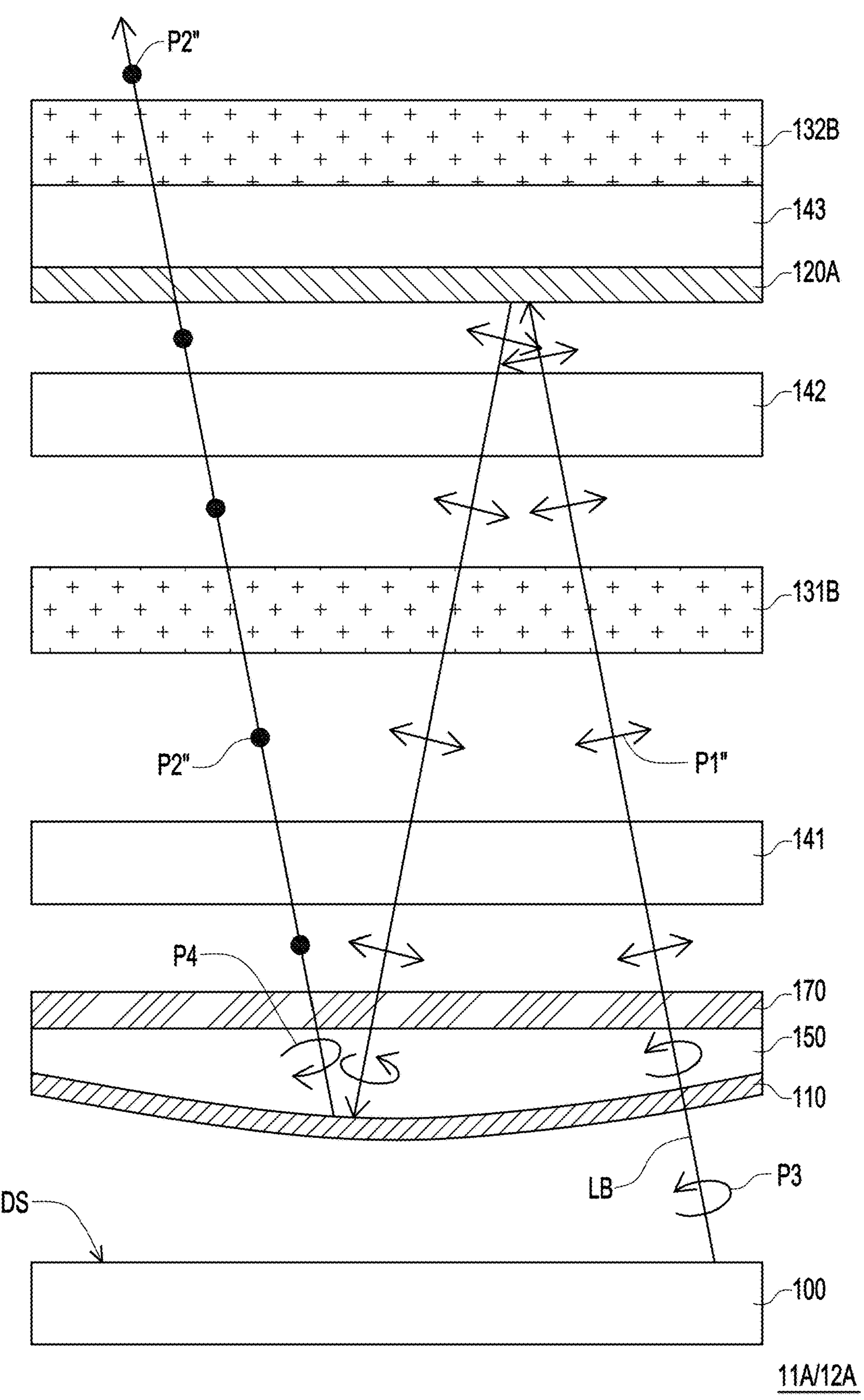
FIG. 10A to FIG. 10D are schematic diagrams of the operation of the optical engine module in FIG. 7 performing imaging at different image positions.

Referring to FIG. 7 and FIG. 10A, different from the first optical engine module 11 and the second optical engine module 12 in FIG. 2, each of the first optical engine module 11A and the second optical engine module 12A of this embodiment further includes a phase retardation layer 170 disposed between the first electrically controlled half waveplate 141 and the transflective layer 110. The phase retardation layer 170 may be disposed on the plane of the lens 150 facing the first electrically controlled half waveplate 141, which may simplify the manufacturing process. The phase retardation layer 170 is configured to switch the polarization state of the light beam LB between the third polarization state P3 and the first polarization state P1", or switch between the fourth polarization state P4 and the second polarization state P2".

In this embodiment, the first polarization state P1" and the second polarization state P2" are, for example, the first linear polarization state and the second linear polarization state that are orthogonal to each other, and the third polarization state P3 and the fourth polarization state P4 are, for example, the first circular polarization state and the second circular polarization state that are orthogonal to each other. For example, in this embodiment, the first circular polarization state and the second circular polarization state are respectively a left-handed circular polarization state and a right-handed circular polarization state.

In order to switch the polarization state of the light beam LB between the third polarization state P3 (i.e., the first circular polarization state) and the first polarization state P1" (i.e., the first linear polarization state) or between the fourth polarization state P4 (i.e., the second circular polarization state) and the second polarization state P2" (i.e., the second linear polarization state), the phase retardation layer 170 is, for example, a quarter waveplate.

In this embodiment, the polarizing reflective layer 120A is, for example, a linear polarizing reflective layer, such as a multi-layer reflective polarizing film (e.g., an advanced polarizing film (APF)).

Referring to FIG. 8A and FIG. 8B, in this embodiment, the first bifocal lens 131B and the second bifocal lens 132B are, for example, a metalens, and may include a transmissive substrate SUB and multiple sub-wavelength units SWU. According to the phase distribution requirements of the bifocal lens, these sub-wavelength units SWU may be disposed on the transmissive substrate SUB in a specific arrangement, and each of sub-wavelength units SWU includes multiple sub-wavelength structures SWS" arranged in different directions (the four sub-wavelength structures SWS" as shown in FIG. 8B). For example, in this embodiment, these sub-wavelength units SWU may be arranged in multiple sub-wavelength unit rows along one direction, and these sub-wavelength unit rows are misaligned to each other along another direction (as shown in FIG. 8A). Through such an arrangement, the bifocal lens may form different phase modulations for light beams of different polarization states.

Therefore, similar to each of the first bifocal lens 131 and the second bifocal lens 132 in FIG. 2 having different focal lengths for light beams of different circular polarization states (as shown in FIG. 3), each of the second bifocal lens 132B and the second bifocal lens 132B may have different focal lengths for light beams of different linear polarization states. In this embodiment, after the light beam having LB the first linear polarization state or the second linear polarization state passes through the first bifocal lens 131B or the second bifocal lens 132B, the polarization state of the light beam LB is unchanged.

Referring to FIG. 9A and FIG. 9B, in this embodiment, the first electrically controlled half waveplate 141, the second electrically controlled half waveplate 142, and the third electrically controlled half waveplate 143 may each include a first substrate SUB1, a second substrate SUB2, a first electrode layer E1, a second electrode layer E2, a first alignment layer AL1, a second alignment layer AL2, and a liquid crystal layer LCL. The first electrode layer E1 and the second electrode layer E2 are respectively disposed on the first substrate SUB1 and the second substrate SUB2. The liquid crystal layer LCL is disposed between the first alignment layer AL1 and the second alignment layer AL2. The first alignment layer AL1 is disposed between the first electrode layer E1 and the liquid crystal layer LCL. The second alignment layer AL2 is disposed between the second electrode layer E2 and the liquid crystal layer LCL.

In this embodiment, the first electrically controlled half waveplate 141, the second electrically controlled half waveplate 142, and the third electrically controlled half waveplate 143 are, for example, vertical alignment (VA), electrically controlled birefringence (ECB), or in-plane switching (IPS) liquid crystal panels. For example, the first alignment layer AL1 and the second alignment layer AL2 respectively have a first alignment direction AD1 and a second alignment direction AD2, and the first alignment direction AD1 is, for example, antiparallel to the second alignment direction AD2. For example, the included angle θ between the first alignment direction AD1 and the polarization direction of the first linear polarization state (i.e., the first polarization state P1") is 45 degrees, the included angle θ between the second alignment direction AD2 and the polarization direction of the second linear polarization state (i.e., the second polarization state P2") is 45 degrees.

These electrically controlled half waveplates may selectively make the light beam have half-wavelength phase delay or no phase delay. These electrically controlled half waveplates are configured to switch the polarization state of the light beam LB between the first polarization state P1" and the second polarization state P2" orthogonal to each other or maintain the polarization state of the light beam LB.

Since other components of the first optical engine module 11A and the second optical engine module 12A are similar to the first optical engine module 11 and the second optical engine module 12 in FIG. 2, please refer to the relevant paragraphs of the above embodiments for details, and details are not repeated herein.

The various operation modes of the optical engine module of this embodiment are exemplarily described below.

Referring to FIG. 10A, when the first electrically controlled half waveplate 141, the second electrically controlled half waveplate 142, and the third electrically controlled half waveplate 143 are disabled, the light beam LB from the display panel 100 forms an image at the first image position (one of the four image positions IMP1 to IMP4 shown in FIG. 1) according to the first light path. After a portion of the light beam LB having the third polarization state P3 (i.e., the first circular polarization state) from the display panel 100 passes through the transflective layer 110 and the lens 150, the polarization state of the light beam LB is unchanged. After passing through the phase retardation layer 170, the light beam LB having a first polarization state P1" (i.e., the first linear polarization state) is formed.

After the light beam LB from the phase retardation layer 170 sequentially passes through the disabled first electrically controlled half waveplate 141, the first bifocal lens 131B, and the disabled second electrically controlled half waveplate 142, and is reflected by the polarizing reflective layer 120A, the polarization state of the light beam LB is unchanged. After the light beam LB from the polarizing reflective layer 120A passes through the disabled second electrically controlled half waveplate 142, the first bifocal lens 131B, and the disabled first electrically controlled half waveplate 141 for the second time, the polarization state of the light beam LB is unchanged. After the light beam LB from the first electrically controlled half waveplate 141 and having the first polarization state P1" passes through the phase retardation layer 170, the polarization state of the light beam LB changes to the third polarization state P3.

Figure 10B:
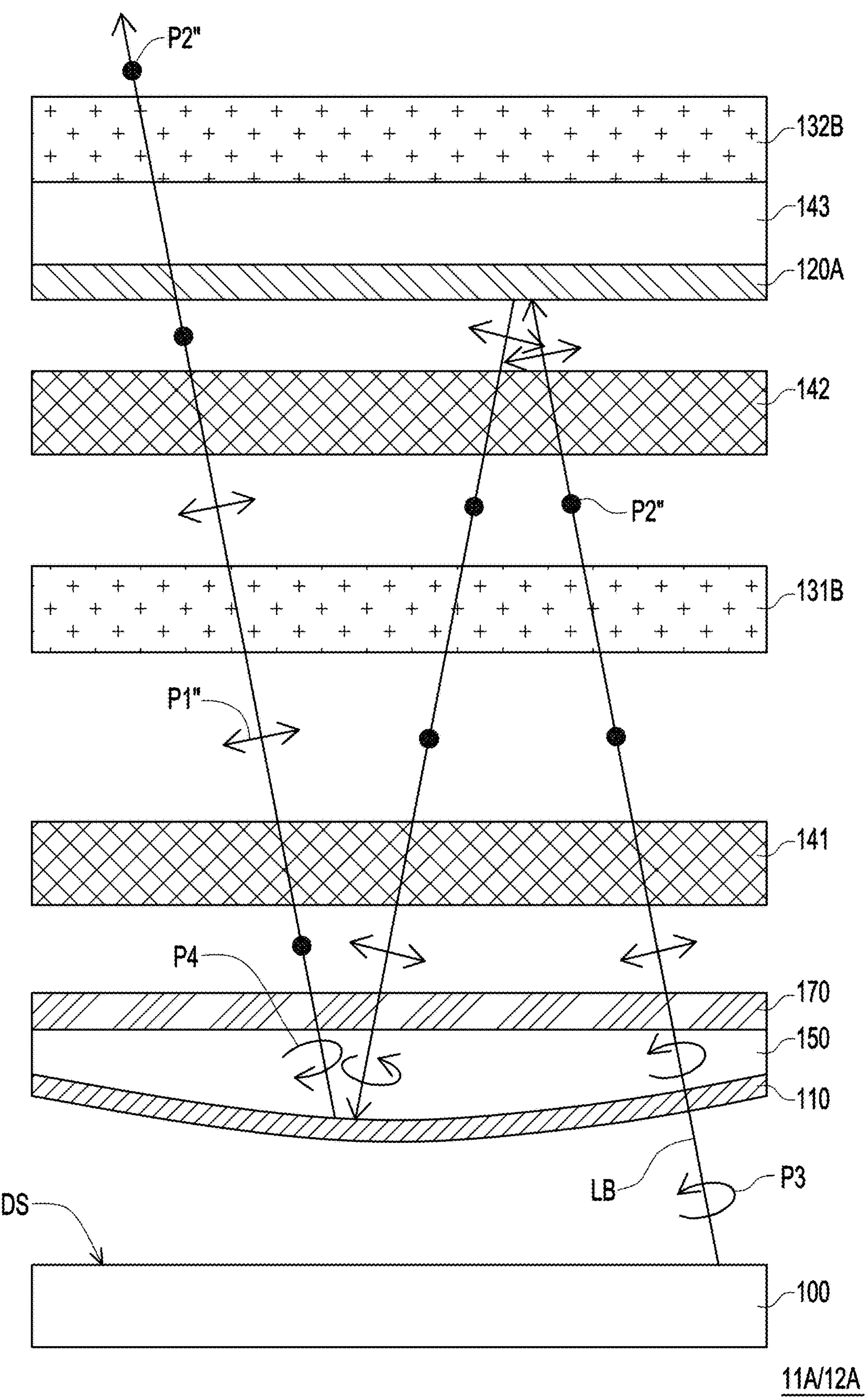

After the light beam LB passing through the lens 150 for the second time and having the third polarization state P3 is reflected by the transflective layer 110, the polarization state of the light beam LB changes to a fourth polarization state P4 (i.e., the second circular polarization state). After the light beam LB reflected by the transflective layer 110 and having the fourth polarization state P4 passes through the lens 150 and the phase retardation layer 170 for the third time, the polarization state of the light beam LB changes to the second polarization state P2" (i.e., the second linear polarization state). After the light beam LB sequentially passes through the disabled first electrically controlled half waveplate 141, the first bifocal lens 131B, the disabled second electrically controlled half wave plate 142, the polarizing reflective layer 120A, the disabled third electrically controlled half waveplate 143, and the second bifocal lens 132B for the third time, the polarization state of the light beam LB (the second polarization state P2") is unchanged, then the light beam LB is transmitted to the left eye LEYE and/or the right eye REYE of the user USR. Referring to FIG. 10B, when the first electrically controlled half waveplate 141 and the second electrically controlled half waveplate 142 are enabled and the third electrically controlled half waveplate 143 is disabled, the light beam LB from the display panel 100 forms an image at the second image position (one of the four image positions IMP1 to IMP4 shown in FIG. 1) according to the second light path. After a portion of the light beam LB having the third polarization state P3 from the display panel 100 passes through the transflective layer 110 and the lens 150, the polarization state of the light beam LB is unchanged. After the light beam LB from the lens 150 and having the third polarization state P3 passes through the phase retardation layer 170, the light beam LB having the first polarization state P1" is formed. After passing through the enabled first electrically controlled half waveplate 141, the polarization state of the light beam LB changes from the first polarization state P1" to the second polarization state P2". After the light beam LB from the first electrically controlled half waveplate 141 and having the second polarization state P2" passes through the first bifocal lens 131B, the polarization state of the light beam LB is unchanged.

After the light beam LB from the first bifocal lens 131B and having the second polarization state P2" passes through the enabled second electrically controlled half waveplate 142, the polarization state of the light beam LB changes to the first polarization state P1". The polarization state of the light beam LB is still first polarization state P1" after the light beam LB is reflected by the polarizing reflective layer 120A. After the light beam LB from the polarizing reflective layer 120A passes through the enabled second electrically controlled half waveplate 142 for the second time, the polarization state of the light beam LB changes from the first polarization state P1" to the second polarization state P2". After the light beam LB from the second electrically controlled half waveplate 142 and having the second polarization state P2" passes through the first bifocal lens 131B for the second time, the polarization state of the light beam LB is unchanged.

After the light beam LB from the first bifocal lens 131B and having the second polarization state P2" passes through the enabled first electrically controlled half waveplate 141 for the second time, the polarization state of the light beam LB changes to the first polarization state P1". The light beam LB having the third polarization state P3 is formed after passing through the phase retardation layer 170. After the light beam LB from the phase retardation layer 170 passes through the lens 150 and is reflected by the transflective layer 110, the polarization state of the light beam LB changes to a fourth polarization state P4. After the light beam LB reflected by the transflective layer 110 passes through the lens 150 and the phase retardation layer 170 for the third time, the polarization state of the light beam LB changes to the second polarization state P2". After the light beam LB from the phase retardation layer 170 passes through the enabled first electrically controlled half waveplate 141 for the third time, the polarization state of the light beam LB changes to the first polarization state P1".

After the light beam LB from the first electrically controlled half wave plate 141 and having the first polarization state P1" passes through the first bifocal lens 131B for the third time, the polarization state of the light beam LB is unchanged. After passing through the enabled second electrically controlled half waveplate 142, the light beam LB having the first polarization state P1" changes to the light beam LB having the second polarization state P2". After the light beam LB from the second electrically controlled half waveplate 142 passes through the polarizing reflection layer 120A, the disabled third electrically controlled half waveplate 143, and the second bifocal lens 132B, the polarization state of the light beam LB is still the second polarization state P2", then the light beam LB is transmitted to the left eye LEYE and/or the right eye REYE of the user USR.

Figure 10C:
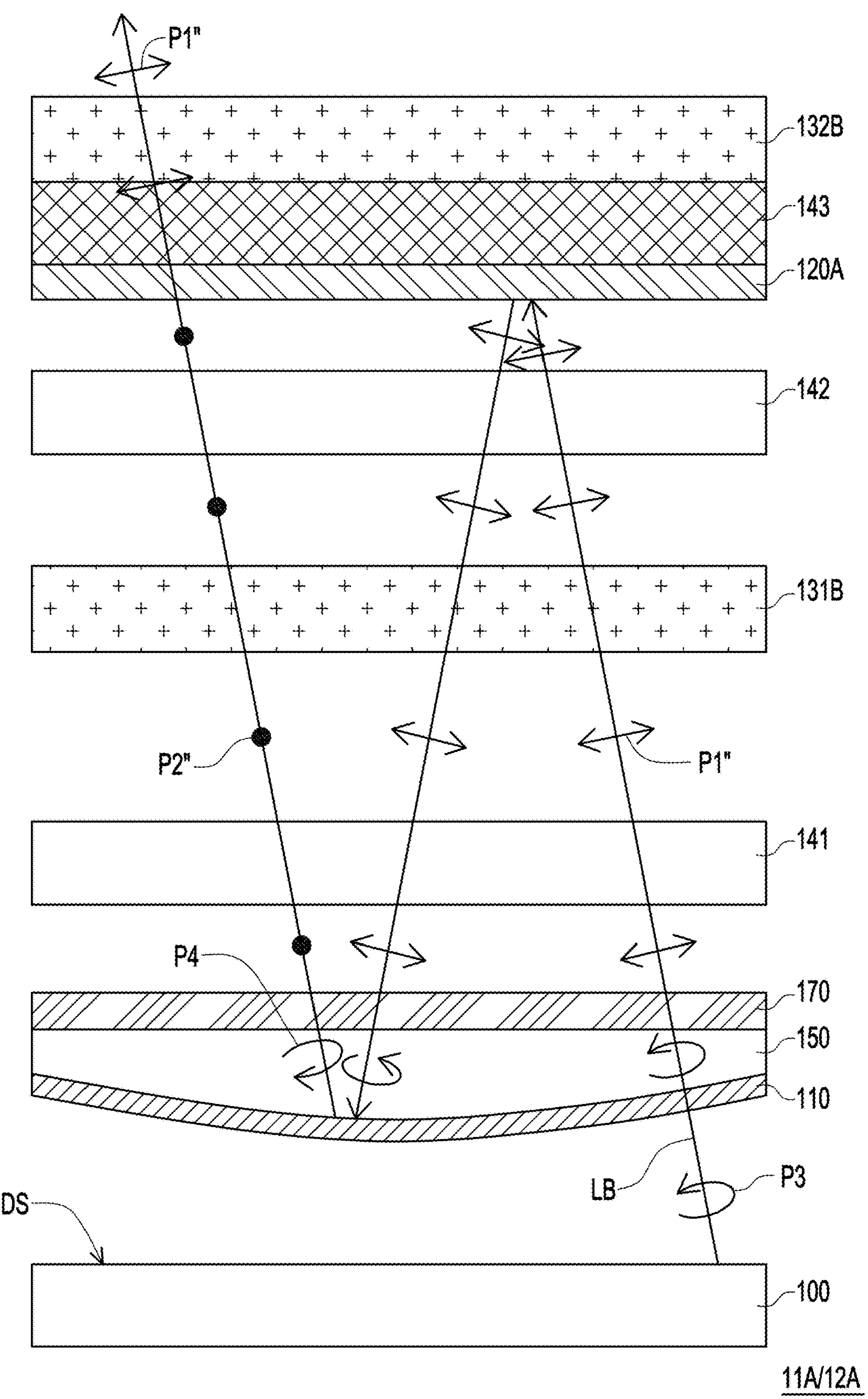

Referring to FIG. 10C, when the first electrically controlled half waveplate 141 and the second electrically controlled half waveplate 142 are disabled and the third electrically controlled half waveplate 143 is enabled, the light beam LB from the display panel 100 forms an image at the third image position (one of the four image positions IMP1 to IMP4 shown in FIG. 1) according to the third light path. The difference between the third light path and the aforementioned first light path (as shown in FIG. 10A) is only the light path after the light beam LB passes through the polarizing reflective layer 120A. On the third light path, after the light beam LB passing through the polarizing reflective layer 120A and having the second polarization state P2" passes through the enabled third electrically controlled half waveplate 143, the polarization state of the light beam LB changes to the first polarization state P1".

After the light beam LB from the third electrically controlled half waveplate 143 passes through the second bifocal lens 132B, the polarization state of the light beam LB is still the first polarization state P1", then the light beam LB is transmitted to the left eye LEYE and/or the right eye REYE of the user USR. Since the other parts of the third optical path are similar to the first optical path in FIG. 10A, please refer to the relevant paragraphs above for details, and details are not repeated herein.

Figure 10D:
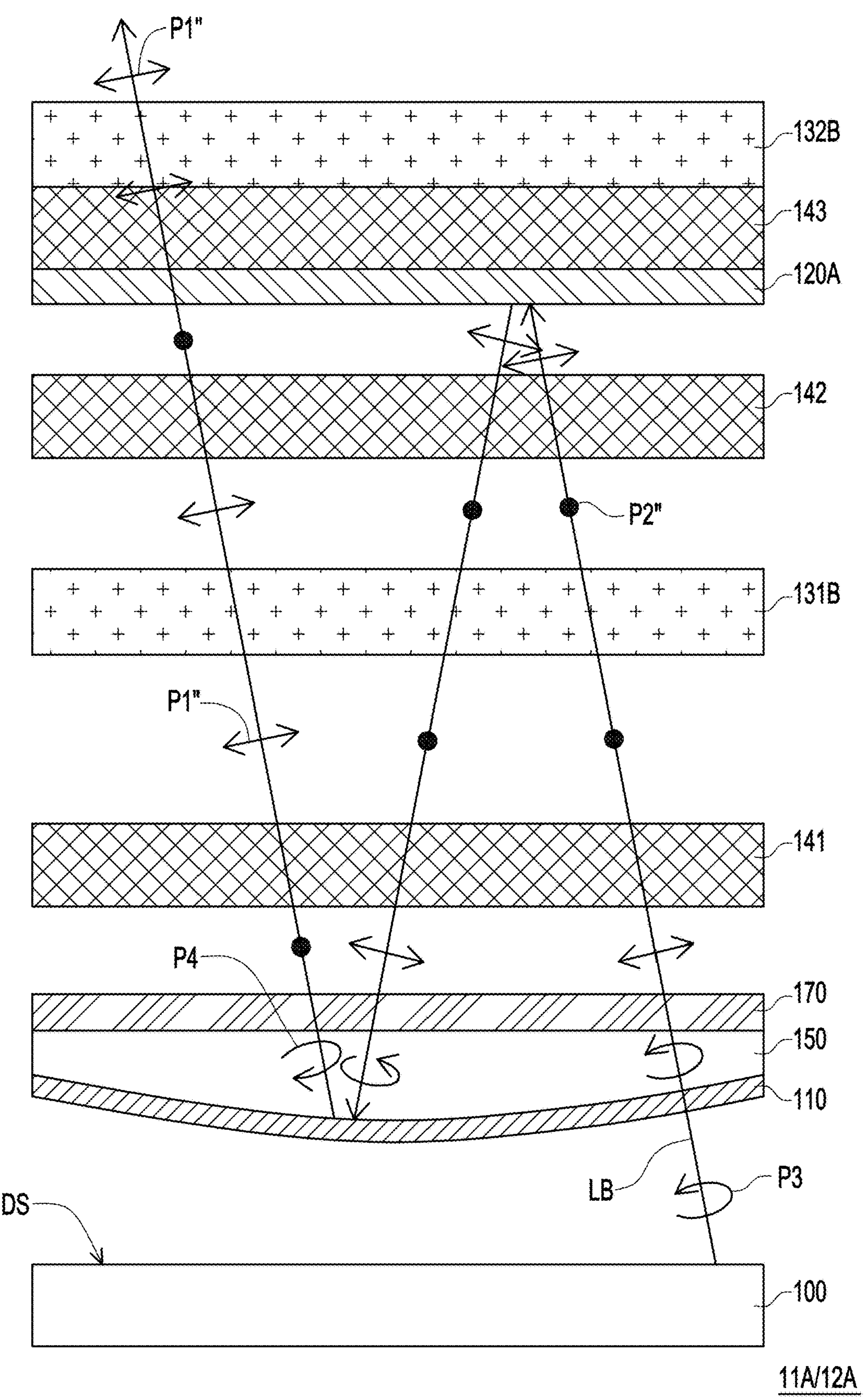

Referring to FIG. 10D, when the first electrically controlled half waveplate 141, the second electrically controlled half waveplate 142, and the third electrically controlled half waveplate 143 are enabled, the light beam LB from the display panel 100 forms an image at the fourth image position (one of the four image positions IMP1 to IMP4 shown in FIG. 1) according to the fourth light path. The difference between the fourth light path and the aforementioned second light path (as shown in FIG. 10B) is only the light path after the light beam LB passes through the polarizing reflective layer 120A. On the fourth light path, after the light beam LB passing through the polarizing reflective layer 120A and having the second polarization state P2" passes through the enabled third electrically controlled half waveplate 143, the polarization state of the light beam LB changes to the first polarization state P1".

After the light beam LB from the third electrically controlled half waveplate 143 passes through the second bifocal lens 132B, the polarization state of the light beam LB is still the first polarization state P1", then the light beam LB is transmitted to the left eye LEYE and/or the right eye REYE of the user USR. Since the other parts of the fourth optical path are similar to the second optical path in FIG. 10B, please refer to the relevant paragraphs above for details, and details are not repeated herein.

The first optical engine module 11A and the second optical engine module 12A of this embodiment may be configured to replace the first optical engine module 11 and the second optical engine module 12 of the near-eye display apparatus 1 shown in FIG. 1. That is, through the four operation modes shown in FIG. 10A to FIG. 10D in this embodiment, the light beam LB emitted by the display panel 100 may be switched between four image positions IMP1 to IMP4 of FIG. 1 for imaging. Accordingly, the vergence-accommodation conflict issue in the user operation of the near-eye display apparatus may be greatly prevented, thereby enhancing the visual experience of the three-dimensional image. On the other hand, by using the reflection properties of the polarizing reflective layer 120A and the transflective layer 110 for the light beam LB of a specific polarization state and the difference in the focusing properties of the bifocal lens for the light beam LB of different polarization states, the imaging distance of images in a limited space may be greatly increased. Therefore, the size and weight of the optical engine module may be effectively reduced.

Figure 11A:
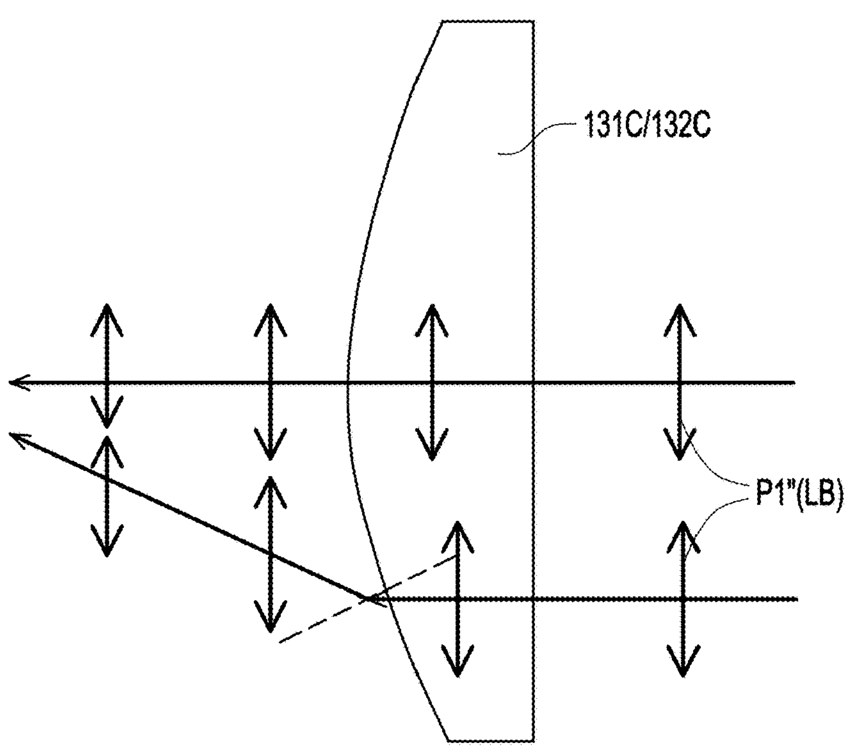
FIG. 11A and FIG. 11B are cross-sectional schematic diagrams of the bifocal lens of the first modified embodiment of FIG. 7.
Figure 11B:
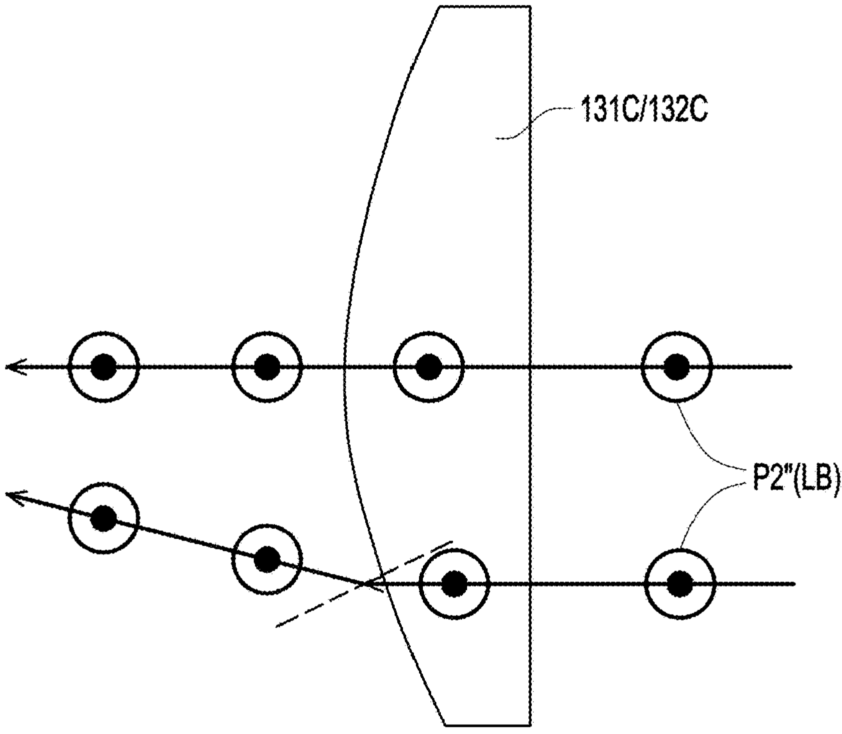
Figure 12A:
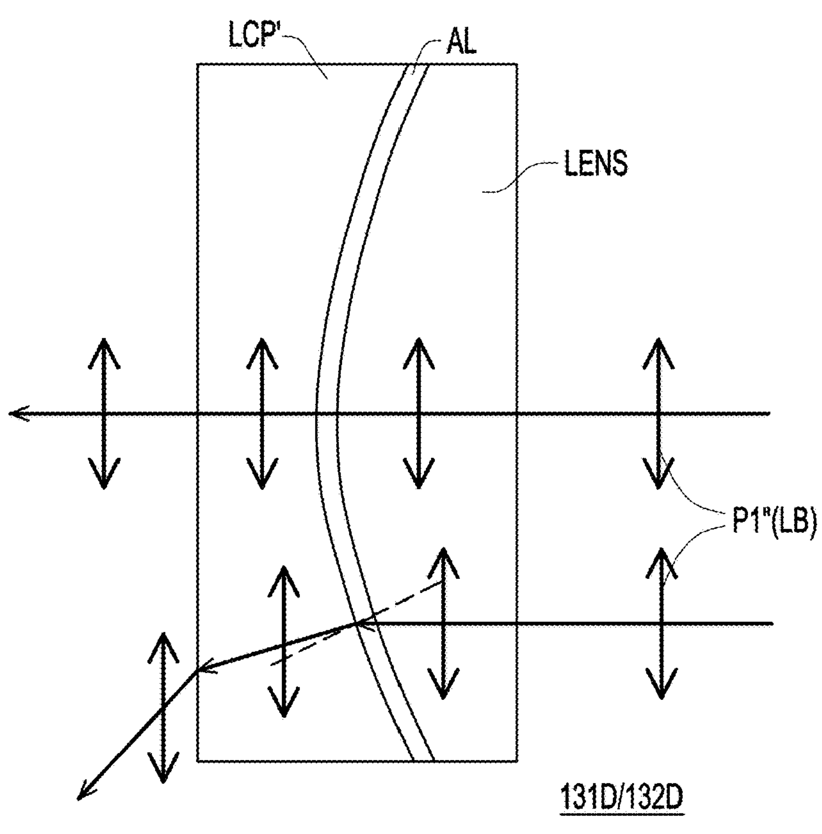
FIG. 12A and FIG. 12B are cross-sectional schematic diagrams of the bifocal lens of the second modified embodiment of FIG. 7.
Figure 12B:
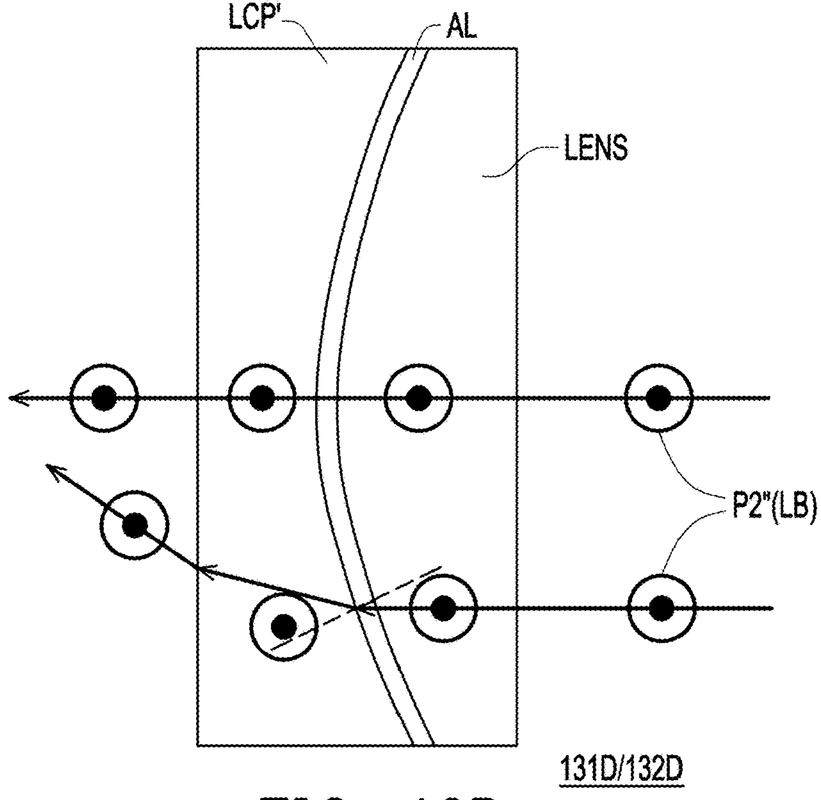
Figures 13A, 13B:
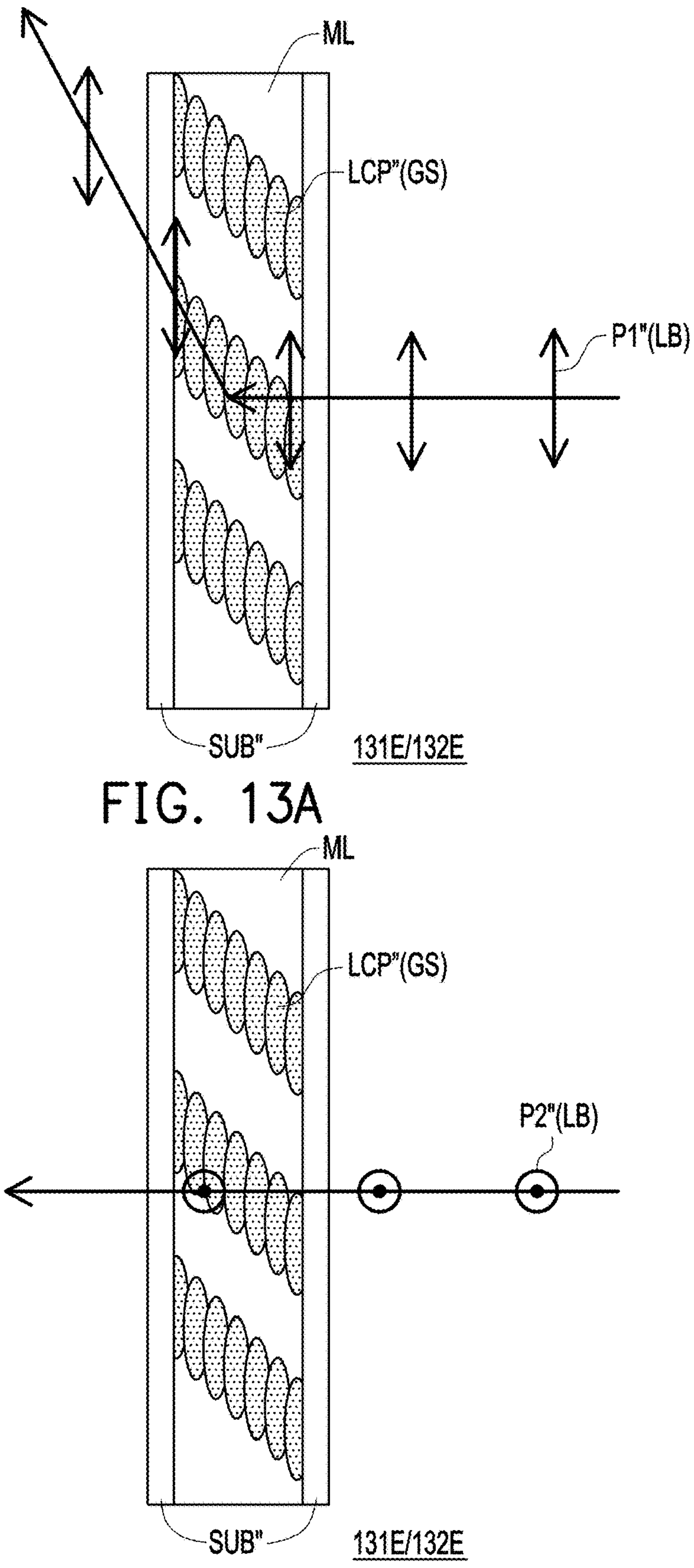
FIG. 13A and FIG. 13B are cross-sectional schematic diagrams of the bifocal lens of the third modified embodiment of FIG. 7.

FIG. 11A and FIG. 11B are cross-sectional schematic diagrams of the bifocal lens of the first modified embodiment of FIG. 7. FIG. 12A and FIG. 12B are cross-sectional schematic diagrams of the bifocal lens of the second modified embodiment of FIG. 7. FIG. 13A and FIG. 13B are cross-sectional schematic diagrams of the bifocal lens of the third modified embodiment of FIG. 7. That the bifocal lenses of the modified embodiments respectively shown in FIG. 11A, FIG. 12A, and FIG. 13A may be configured to replace the bifocal lens in FIG. 7, so as to generate different focusing or refraction effects on light beams of different linear polarization states.

Referring to FIG. 11A and FIG. 11B, in the first modified embodiment, each of the first bifocal lens 131C and the second bifocal lens 132C is a birefringence lens, and may be made of a material having a birefringence characteristic such as liquid crystal polymer (LCP), calcite, or the like. For example, the bifocal lens of this embodiment has a first refractive index in the polarization direction of the first linear polarization state (e.g., the first polarization state P1" in FIG. 10A and FIG. 11A), and has a second refractive index in the polarization direction of the second linear polarization state (e.g., the second polarization state P2" in FIG. 10A and FIG. 11B). The first refractive index is different from at the second index of refraction. In this embodiment, the first refractive indices of each of the first bifocal lens 131C and the second bifocal lens 132C may be selectively greater than each of their second refractive indices.

Referring to FIG. 12A and FIG. 12B, in the second modified embodiment, each of the first bifocal lens 131D and the second bifocal lens 132D is, for example, a birefringent compound lens. The birefringent compound lens may include a lens LENS and a liquid crystal polymer LCP', in which the liquid crystal polymer LCP' is disposed on one side surface of the lens LENS. The liquid crystal polymer LCP' has a first refractive index in the polarization direction of the first linear polarization state (e.g., the first polarization state P1" in FIG. 10A and FIG. 12A), and has a second refractive index in the polarization direction of the second linear polarization state (e.g., the second polarization state P2" in FIG. 10A and FIG. 12B). The first refractive index is different from at the second index of refraction. The lens LENS has a third refractive index different from the first refractive index and the second refractive index.

In this embodiment, the first refractive index of the liquid crystal polymer LCP' may be greater than the second refractive index and the third refractive index of the lens LENS, and the second refractive index of the liquid crystal polymer LCP' may be less than the third refractive index of the lens LENS. Therefore, when the light beam LB with the first polarization state P1" enters the liquid crystal polymer LCP' from the lens LENS side, an astigmatism effect (as shown in FIG. 12A) is generated, and when the light beam LB with the second polarization state P2" enters the liquid crystal polymer LCP' from the lens LENS side, a concentrating effect (as shown in FIG. 12B) is generated.

In one embodiment, an alignment layer AL may also be provided between the liquid crystal polymer LCP' of the bifocal lens and the lens LENS to arrange the long axis direction (i.e., the optical axis) of the liquid crystal molecules in the liquid crystal polymer LCP'.

Referring to FIG. 13A and FIG. 13B, in the third modified embodiment, the first bifocal lens 131E and the second bifocal lens 132E are, for example, polarized optical diffraction elements, and may include two substrates SUB", a matrix ML, and a grating structure GS. The matrix ML is filled between the two substrates SUB", and the grating structure GS is embedded in the matrix ML.

The grating structure GS may be formed of the liquid crystal polymer LCP", and the grating structure GS has a first refractive index in the polarization direction of the first linear polarization state (e.g., the first polarization state P1" in FIG. 10A and FIG. 13A), and has a second refractive index in the polarization direction of the second linear polarization state (e.g., the second polarization state P2" in FIG. 10A and FIG. 13B). The first refractive index is different from at the second index of refraction. The matrix ML has a third refractive index equal to the first refractive index or the second refractive index.

For example, in this embodiment, the second refractive index of the liquid crystal polymer LCP" and the third refractive index of the matrix ML may be selectively the same. Therefore, when the light beam LB passes through the first bifocal lens 131E or the second bifocal lens 132E in the first polarization state P1", the refraction of the optical path occurs due to the difference in refractive index between the liquid crystal polymer LCP" and the matrix ML (as shown in FIG. 13A). On the contrary, when the light beam LB passes through the first bifocal lens 131E or the second bifocal lens 132E in the second polarization state P2", no refraction of the optical path occurs because the refractive index of the liquid crystal polymer LCP" is the same as the refractive index of the matrix ML (as shown in FIG. 13B).

In this embodiment, the grating structure GS may be arranged in the matrix ML in an inclined manner relative to the stacking direction of the two substrates SUB", so as to achieve a focusing effect.

Figure 14A:
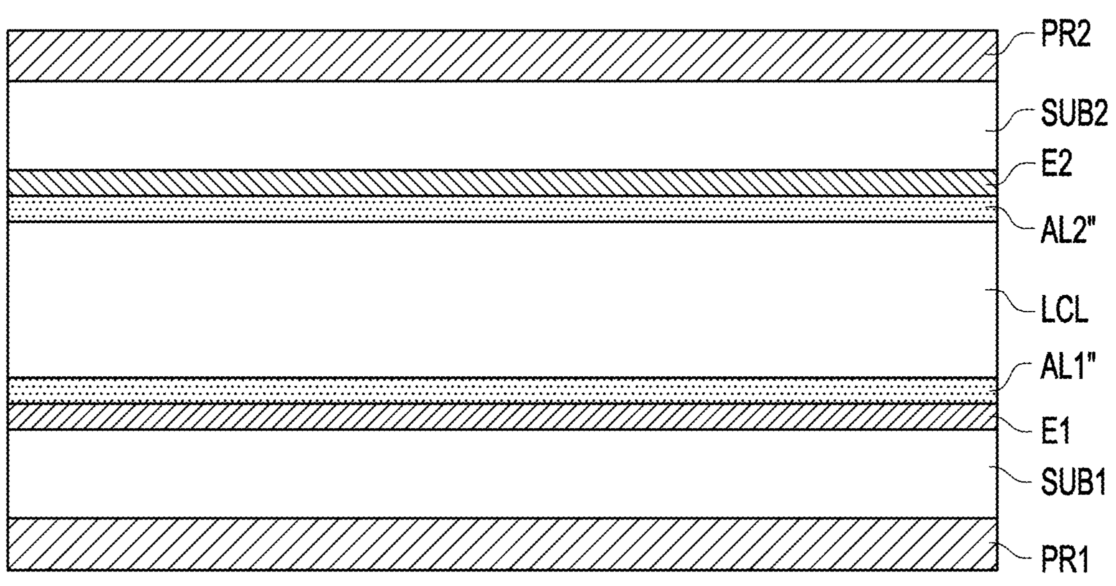
FIG. 14A is a cross-sectional schematic diagram of an electrically controlled half waveplate according to another modified embodiment of FIG. 7.
Figure 14B:
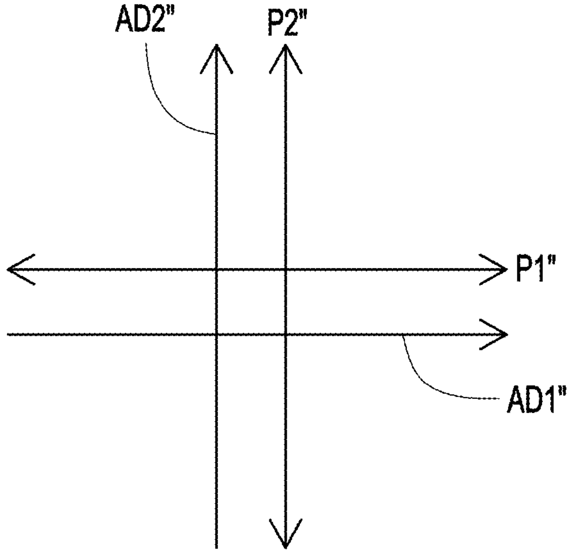
FIG. 14B is a schematic diagram showing the configuration relationship between the alignment direction of the alignment layer and the polarization direction of the polarization state of the incident light beam in FIG. 14A.

FIG. 14A is a cross-sectional schematic diagram of an electrically controlled half waveplate according to another modified embodiment of FIG. 7. FIG. 14B is a schematic diagram showing the configuration relationship between the alignment direction of the alignment layer and the polarization direction of the polarization state of the incident light beam in FIG. 14A.

Referring to FIG. 14A and FIG. 14B, different from the first electrically controlled half waveplate 141, the second electrically controlled half waveplate 142, and the third electrically controlled half waveplate 143 shown in FIG. 7, the first electrically controlled half waveplate 141A, the second electrically controlled half waveplate 142A, and the third electrically controlled half waveplate 143A in this embodiment is, for example, a twisted nematic (TN) liquid crystal panel, and each further includes a phase retardation layer PR1 and a phase retardation layer PR2.

That is, in this embodiment, the first alignment direction AD1" of the first alignment layer AL1" may be perpendicular to the second alignment direction AD2" of the second alignment layer AL2". The included angle between the first alignment direction AD1" of the first alignment layer AL1" of the electrically controlled half waveplate and the polarization direction of the first linear polarization state (e.g., the first polarization state P1" in FIG. 10A) is 0 degrees or 90 degrees. That is, the first alignment direction AD1" may be parallel to or perpendicular to the polarization direction of the first linear polarization state.

The phase retardation layer PR1 and the phase retardation layer PR2 are respectively disposed on two opposite sides of the liquid crystal layer LCL. The phase retardation layer PR1 is disposed on a side surface of the first substrate SUB1 away from the liquid crystal layer LCL, and the phase retardation layer PR2 is disposed on a side surface of the second substrate SUB2 away from the liquid crystal layer LCL.

The electrically controlled half waveplate in FIG. 14A may be configured to replace the electrically controlled half waveplate in FIG. 2, and both the phase retardation layer PR1 and the phase retardation layer PR2 are, for example, quarter waveplates. The structure of the electrically controlled half waveplate in FIG. 14A after removing the phase retardation layer PR1 and the phase retardation layer PR2, or the structure in which both the phase retardation layer PR1 and the phase retardation layer PR2 are half waveplates, may also replace the electrically controlled half waveplate in FIG. 7.

To sum up, in the optical engine module and the near-eye display apparatus according to an embodiment of the present invention, a transflective layer is provided between the display surface of the display panel and the polarizing reflective layer. By disposing two electrically controlled half waveplates and a bifocal lens located between the two electrically controlled half waveplates between the transflective layer and the polarizing reflective layer, the light beam from the display panel may switch the image position between at least two image positions. Accordingly, the vergence-accommodation conflict issue in the user operation of the near-eye display apparatus may be effectively prevented, thereby enhancing the visual experience of the three-dimensional image. On the other hand, by using the reflection properties of the polarizing reflective layer and the transflective layer for the light beam of a specific polarization state and the difference in the focusing properties of the bifocal lens for the light beam of different polarization states, the imaging distance of images in a limited space may be greatly increased. Therefore, the size and weight of the optical engine module may be effectively reduced.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. An optical engine module, comprising:

a display panel, configured to emit a light beam;

a transflective layer, disposed on one side of a display surface of the display panel, and configured to allow a portion of the light beam to pass through and reflect another portion of the light beam;

a polarizing reflective layer, disposed on a side of the transflective layer away from the display panel, wherein the polarizing reflective layer is configured to allow the light beam having a first polarization state to pass through, and reflect the light beam having a second polarization state, the first polarization state is orthogonal to the second polarization state;

a first bifocal lens, disposed between the transflective layer and the polarizing reflective layer, wherein the first bifocal lens has a first focal length for the light beam having the first polarization state and has a second focal length for the light beam having the second polarization state, the first focal length is different from the second focal length;

a first electrically controlled half waveplate, disposed between the first bifocal lens and the transflective layer, wherein the first electrically controlled half waveplate is configured to switch a polarization state of the light beam between the first polarization state and the second polarization state or maintain the polarization state of the light beam; and a second electrically controlled half waveplate, disposed between the first bifocal lens and the polarizing reflective layer, wherein the second electrically controlled half waveplate is configured to switch the polarization state of the light beam between the first polarization state and the second polarization state or maintain the polarization state of the light beam.

2. The optical engine module according to claim 1, wherein when the first electrically controlled half waveplate and the second electrically controlled half waveplate are disabled, the light beam from the display panel forms an image at a first image position, when the first electrically controlled half waveplate and the second electrically controlled half waveplate are enabled, the light beam from the display panel forms an image at a second image position, and the first image position is different from the second image position.

3. The optical engine module according to claim 1, wherein the first polarization state and the second polarization state are a first circular polarization state and a second circular polarization state orthogonal to each other.

4. The optical engine module according to claim 3, wherein the first bifocal lens is configured to change the polarization state of the light beam from the first circular polarization state to the second circular polarization state, or from the second circular polarization state to the first circular polarization state.

5. The optical engine module according to claim 3, wherein the polarization state of the light beam reflected by the transflective layer changes from the first circular polarization state to the second circular polarization state, or from the second circular polarization state to the first circular polarization state.

6. The optical engine module according to claim 1, further comprising:

a second bifocal lens, disposed on a side of the polarizing reflective layer away from the first bifocal lens, wherein the second bifocal lens has a third focal length for the light beam having the first polarization state and a fourth focal length for the light beam having the second polarization state, the third focal length is different from the fourth focal length; and a third electrically controlled half waveplate, disposed between the polarizing reflective layer and the second bifocal lens, wherein third electrically controlled half waveplate is configured to switch the polarization state of the light beam between the first polarization state and the second polarization state or maintain the polarization state of the light beam.

7. The optical engine module according to claim 6, wherein the second bifocal lens is configured to change the polarization state of the light beam from the first polarization state to the second polarization state, or from the second polarization state to the first polarization state.

8. The optical engine module according to claim 6, wherein when the first electrically controlled half waveplate, the second electrically controlled half waveplate, and the third electrically controlled half waveplate are disabled, the light beam from the display panel forms an image at a first image position, when the first electrically controlled half waveplate and the second electrically controlled half waveplate are enabled and the third electrically controlled half waveplate is disabled, the light beam from the display panel forms an image at a second image position, and the first image position is different from the second image position.

9. The optical engine module according to claim 8, wherein when the first electrically controlled half waveplate and the second electrically controlled half waveplate are disabled and the third electrically controlled half waveplate is enabled, the light beam from the display panel forms an image at a third image position, when the first electrically controlled half waveplate, the second electrically controlled half waveplate, and the third electrically controlled half waveplate are enabled, the light beam from the display panel forms an image at a fourth image position, and the first image position, the second image position, the third image position, and the fourth image position are different from each other.

10. The optical engine module according to claim 1, further comprising:

a first phase retardation layer, disposed between the first electrically controlled half waveplate and the transflective layer, and configured to switch the polarization state of the light beam between a third polarization state and the first polarization state, or switch between a fourth polarization state and the second polarization state, wherein the light beam transmitted from the display panel to the transflective layer has the third polarization state or the fourth polarization state, and the third polarization state is orthogonal to the fourth polarization state.

11. The optical engine module according to claim 10, wherein the first polarization state and the second polarization state are a first linear polarization state and a second linear polarization state orthogonal to each other, the third polarization state and the fourth polarization state are a first circular polarization state and a second circular polarization state orthogonal to each other.

12. The optical engine module according to claim 11, wherein after the light beam having the first linear polarization state or the second linear polarization state passes through the first bifocal lens, the polarization state of the light beam is unchanged.

13. The optical engine module according to claim 11, wherein each of the first electrically controlled half waveplate and the second electrically controlled half waveplate comprises:

a first alignment layer and a second alignment layer, respectively having a first alignment direction and a second alignment direction, included angle between the first alignment direction and a polarization direction of the first linear polarization state is 45 degrees, included angle between the second alignment direction and a polarization direction of the second linear polarization state is 45 degrees; and a liquid crystal layer, disposed between the first alignment layer and the second alignment layer.

14. The optical engine module according to claim 11, wherein each of the first electrically controlled half waveplate and the second electrically controlled half waveplate comprises:

a first alignment layer and a second alignment layer, respectively having a first alignment direction and a second alignment direction perpendicular to each other, included angle between the first alignment direction and a polarization direction of the first linear polarization state is 0 degree or 90 degrees; and a liquid crystal layer, disposed between the first alignment layer and the second alignment layer.

15. The optical engine module according to claim 14, wherein each of the first electrically controlled half waveplate and the second electrically controlled half waveplate further comprises:

two second phase retardation layers, respectively disposed on two opposite sides of the liquid crystal layer.

16. The optical engine module according to claim 11, wherein the first bifocal lens has a first refractive index in a polarization direction of the first linear polarization state, and has a second refractive index in a polarization direction of the second linear polarization state, the first refractive index is different from the second refractive index.

17. The optical engine module according to claim 16, wherein the first bifocal lens comprises:

a lens, having a third refractive index different from the first refractive index and the second refractive index; and a liquid crystal polymer, disposed on one side of the lens, wherein the liquid crystal polymer has the first refractive index and the second refractive index respectively in the polarization direction of the first linear polarization state and the polarization direction of the second linear polarization state.

18. The optical engine module according to claim 11, wherein the first bifocal lens comprises:

a grating structure, having a first refractive index and a second refractive index respectively in a polarization direction of the first linear polarization state and a polarization direction of the second linear polarization state, the first refractive index is different from the second refractive index; and a matrix, having a third refractive index, wherein the grating structure is embedded in the matrix, and the third refractive index is equal to the first refractive index or the second refractive index.

19. The optical engine module according to claim 1, further comprising:

a lens, disposed between the first electrically controlled half waveplate and the display panel, wherein the transflective layer is disposed on a side surface of the lens facing the display panel or the first electrically controlled half waveplate.

20. The optical engine module according to claim 1, wherein the first bifocal lens is a Pancharatnam-Berry phase metalens, a Pancharatnam-Berry phase liquid crystal lens, or a metalens.

21. A near-eye display apparatus, configured to be worn on a head of a user, comprising:

a main body; and a first optical engine module and a second optical engine module, disposed on the main body, each of the first optical engine module and the second optical engine module comprising:

a display panel, configured to emit a light beam;

a transflective layer, disposed on one side of a display surface of the display panel, and configured to allow a portion of the light beam to pass through and reflect another portion of the light beam;

a polarizing reflective layer, disposed on a side of the transflective layer away from the display panel, wherein the polarizing reflective layer is configured to allow the light beam having a first polarization state to pass through, and reflect the light beam having a second polarization state, the first polarization state is orthogonal to the second polarization state;

a first bifocal lens, disposed between the transflective layer and the polarizing reflective layer, wherein the first bifocal lens has a first focal length for the light beam having the first polarization state and has a second focal length for the light beam having the second polarization state, the first focal length is different from the second focal length;

a first electrically controlled half waveplate, disposed between the first bifocal lens and the transflective layer, wherein the first electrically controlled half waveplate is configured to switch a polarization state of the light beam between the first polarization state and the second polarization state or maintain the polarization state of the light beam; and a second electrically controlled half waveplate, disposed between the first bifocal lens and the polarizing reflective layer, wherein the second electrically controlled half waveplate is configured to switch the polarization state of the light beam between the first polarization state and the second polarization state or maintain the polarization state of the light beam.

22. The near-eye display apparatus according to claim 21, wherein each of the first optical engine module and the second optical engine module further comprises:

a second bifocal lens, disposed on a side of the polarizing reflective layer away from the first bifocal lens, wherein the second bifocal lens has a third focal length for the light beam having the first polarization state and a fourth focal length for the light beam having the second polarization state, the third focal length is different from the fourth focal length; and a third electrically controlled half waveplate, disposed between the polarizing reflective layer and the second bifocal lens, wherein the third electrically controlled half waveplate is configured to switch the polarization state of the light beam between the first polarization state and the second polarization state or maintain the polarization state of the light beam.

* * * * *